US012703998B2

(12) United States Patent
Liu et al.

(10) Patent No.: US 12,703,998 B2
(45) Date of Patent: Aug. 11, 2026

(54) DOOR LOCK ASSEMBLY AND ELECTRICAL EQUIPMENT

(71) Applicant: ILLINOIS TOOL WORKS INC., Glenview, IL (US)

(72) Inventors: Yukun Liu, Dongguan City (CN); Yang Wang, Dongguan City (CN)

(73) Assignee: ILLINOIS TOOL WORKS INC., Glenview, IL (US)

(*) Notice: Subject to any disclaimer, the term of this patent is extended or adjusted under 35 U.S.C. 154(b) by 105 days.

(21) Appl. No.: 18/664,766

(22) Filed: May 15, 2024

(65) Prior Publication Data

US 2024/0384566 A1 Nov. 21, 2024

(30) Foreign Application Priority Data

May 16, 2023 (CN) ........................ 202310551809.2

(51) Int. Cl.
*E05B 47/00* (2006.01)
*A47L 15/42* (2006.01)
(Continued)

(52) U.S. Cl.
CPC ...... *E05B 47/0012* (2013.01); *A47L 15/4259* (2013.01); *E05B 15/022* (2013.01);
(Continued)

(58) Field of Classification Search
CPC ............... E05B 47/0046; E05B 47/026; E05B 47/0603; E05B 2047/002;
(Continued)

(56) References Cited

U.S. PATENT DOCUMENTS

| | | | | |
|---|---|---|---|---|
| 4,934,800 A * | 6/1990 | Choi | E05B 53/00 | 292/DIG. 60 |
| 10,582,828 B1 * | 3/2020 | Fawaz | A47L 15/507 | |

(Continued)

FOREIGN PATENT DOCUMENTS

| | | | | |
|---|---|---|---|---|
| CN | 108286375 A * | 7/2018 | E05B 47/0012 |
| DE | 4420775 C1 * | 8/1995 | A47L 15/48 |

(Continued)

OTHER PUBLICATIONS

EPO, Munich, Germany, EPO Form 1503 03 82, European Search Report for European Patent Application No. EP 24 17 6075, Oct. 29, 2024 (11 pages).

*Primary Examiner* — Christine M Mills
*Assistant Examiner* — Peter H Watson
(74) *Attorney, Agent, or Firm* — Pauley Erickson & Swanson

(57) ABSTRACT

A door lock assembly includes a door lock slider, a slider gear and a bias device. The door lock slider reciprocates in a first linear direction and a second linear direction along the length of the door lock slider. The door lock slider includes a slider body provided with a slider groove in a length direction of the door lock slider body. The slider groove is provided with a slider rack. The slider gear is mounted in the slider groove and rotates about a rotating shaft. The slider gear engages with the door lock slider rack. When the slider gear rotates clockwise or counterclockwise, the door lock slider reciprocates in the first linear direction or the second linear direction. The bias device is configured to drive the slider gear which drives the door lock slider in the second linear direction.

22 Claims, 19 Drawing Sheets

(51) Int. Cl.

| | |
|---|---|
| ***E05B 15/02*** | (2006.01) |
| ***E05B 47/02*** | (2006.01) |
| ***E05B 53/00*** | (2006.01) |
| ***E05B 63/22*** | (2006.01) |

(52) U.S. Cl.
CPC .......... *E05B 47/026* (2013.01); *E05B 53/003* (2013.01); *E05B 63/22* (2013.01); *E05B 2047/0016* (2013.01); *E05B 2047/002* (2013.01); *E05B 2047/0037* (2013.01)

(58) Field of Classification Search
CPC ..... E05B 2047/0016; E05B 2047/0037; E05B 53/00; E05B 53/003; E05B 53/005; E05B 15/022; E05B 63/22; E05B 15/04; E05B 2015/0403; E05B 2015/0496; A47L 15/4259; D06F 39/14; D06F 37/42; D06F 34/20
See application file for complete search history.

(56) References Cited

U.S. PATENT DOCUMENTS

| | | | | |
|---|---|---|---|---|
| 2011/0279004 | A1 * | 11/2011 | Assmann | ............ A47L 15/4259 312/228 |
| 2024/0344597 | A1 * | 10/2024 | Li | ........................... E05B 47/00 |

FOREIGN PATENT DOCUMENTS

| | | | | | |
|---|---|---|---|---|---|
| EP | 1 358 835 | A2 | | 5/2003 | |
| EP | 2 394 558 | B1 | | 9/2016 | |
| KR | 2016 0050635 | A | | 5/2016 | |
| LU | 102850 | B1 | * | 2/2023 | ......... G07C 9/00896 |
| WO | WO-2009146874 | A1 | * | 12/2009 | ........... A47L 15/488 |
| WO | WO-2014088910 | A1 | * | 6/2014 | ......... A47L 15/4259 |
| WO | WO-2016199056 | A1 | * | 12/2016 | ......... A47L 15/4259 |
| WO | WO 2022 030720 | A1 | | 2/2022 | |

* cited by examiner

DOOR LOCK ASSEMBLY AND ELECTRICAL EQUIPMENT

CROSS-REFERENCE TO RELATED APPLICATIONS

Chinese Patent Application CN 2023105518092, filed on 16 May 2023, the priority document corresponding to this invention, to which a foreign priority benefit is claimed under Title 35, United States Code, Section 119, and its entire teachings are incorporated, by reference, into this specification.

BACKGROUND OF THE INVENTION

Field of the Invention

The present disclosure relates to a door lock assembly of an electrical appliance and an electrical equipment, and in particular, to a door lock assembly capable of automatically opening or closing a door and an electrical equipment with the door lock assembly.

Discussion of Related Art

Electrical equipment, such as a dishwasher, often has a door lock mounted on its door. A conventional door lock can be unlocked by physical pulling or locked by physical pushing, that is, the door can be unlocked by manually pulling a latch on the door, and the door can be locked by manually colliding a door hook on the door with a door hook hole.

SUMMARY OF THE INVENTION

The inventors have noticed that after a dishwasher completes a washing process, a drying process is required, in which case, an operator expects that a door can be kept in a partially open state, for example, leaving a small gap that allows sufficient ventilation, such that hot steam is discharged from an inner cavity of the dishwasher, thereby accelerating a faster drying process. The inventors have also noticed that during the drying process, the operator typically does not wait beside the dishwasher to wait the drying process to complete.

Therefore, a door lock assembly may be arranged on a side of the dishwasher opposite a door hook, and the door lock assembly is provided with a slider. The slider is provided with a door hook hole cooperating with the door hook. A control device controls the slider to extend or retract by a certain distance, so as to control the opening or closing of the door within a certain opening range, to realize automatic opening to a heat dissipation position or automatic closing of the door. Specifically, the slider can be kept at an extended position through the cooperative arrangement between a bias device and the slider. When the door gap is to be closed, a motor drives to overcome a bias force of the bias device and drive the slider to move from the extended position to a retracted position. When the door is to be opened with the door gap again, the motor stops driving, and the bias device of the slider can bring the slider back to the extended position from the retracted position under the action of the bias force, so as to push the door open by a certain distance.

In some existing designs, a force acting point where the bias device applies the bias force on the door lock slider is located on an outer side (a single side) of the slider, such that the bias device needs to generate a large bias force to drive the slider to move, and the slider needs to overcome, during movement, an additional acting force to balance an unnecessary torque exerted by the bias device on the outer side of the slider. In addition, in some existing designs, a driving device is in rigid connection with the slider, such that the driving device is fixed relative to a door lock box, which is not conducive to meeting a requirement for a compact door lock box to make full use of space.

Therefore, according to a first aspect of the present disclosure, a door lock assembly is provided, comprising a door lock slider, a slider gear and a bias device, wherein the door lock slider is configured to reciprocate in a first linear direction and a second linear direction along the length of the door lock slider, the door lock slider comprises a slider body, the door lock slider body is provided with a slider groove in a length direction of the door lock slider body, and the door lock slider groove is provided with a slider rack on at least one side; the slider gear is mounted in the door lock slider groove, the slider gear is configured to rotate about a rotating shaft, the slider gear engages with the door lock slider rack, and the slider gear and the door lock slider rack are configured such that: when the slider gear rotates about the rotating shaft in a first rotation direction or a second rotation direction, the door lock slider reciprocates in the first linear direction or the second linear direction; and the bias device is configured to drive the slider gear, such that the slider gear drives the door lock slider in the second linear direction.

According to the first aspect of the present disclosure, the force acting point at which the slider gear drives the door lock slider coincides or substantially coincides with a moving path of the door lock slider.

According to the first aspect of the present disclosure, the door lock slider groove is provided with slider racks on both sides.

According to the first aspect of the present disclosure, the door lock assembly is configured to lock a door of an electrical equipment, and the door has an open position, a closed position and one or more intermediate positions; the first linear direction of the door lock slider corresponds to a moving direction of the door from the one or more intermediate positions to the closed position; and the second linear direction of the door lock slider corresponds to a moving direction of the door from the closed position to the one or more intermediate positions, wherein the one or more intermediate positions are located between the open position and the closed position.

According to the first aspect of the present disclosure, the door lock slider groove is disposed in the length direction of the door lock slider.

According to the first aspect of the present disclosure, the bias device, the slider gear and the door lock slider rack are configured such that: when the door lock slider moves in the first linear direction, the rotation of the slider gear in the first rotation direction allows the bias device to accumulate bias force; and the bias force accumulated on the bias device can drive the slider gear to rotate in the second rotation direction, thereby driving the door lock slider to move in the second linear direction.

According to the first aspect of the present disclosure, the rotating shaft extends into the slider groove of the door lock slider.

According to the first aspect of the present disclosure, the bias device is a rotating bias device; and the bias force is a torsional force.

According to the first aspect of the present disclosure, the bias device is a coil spring, and the slider gear is secured to the coil spring coaxially to allow the rotation of the slider gear to drive the coil spring to twist so as to accumulate the torsional force.

According to the first aspect of the present disclosure, the door lock slider is provided with a door hook hole at one end of the door lock slider, and the door hook hole is configured to accommodate a door hook.

According to the first aspect of the present disclosure, the door lock assembly further comprises a locking pin, and the locking pin is configured such that the door lock slider is locked to be unmovable when the locking pin is inserted into the door lock slider; or the door lock slider is released to be able to reciprocate when the locking pin disengages from the door lock slider.

According to the first aspect of the present disclosure, the door lock assembly further comprises an actuator driving the locking pin to move.

According to the first aspect of the present disclosure, the door lock slider is provided with a pin slot, wherein the locking pin and the pin slot are configured such that: the door lock slider is locked to be unmovable when the locking pin is inserted into the pin slot; or the door lock slider is released to be able to reciprocate when the locking pin disengages from the pin slot.

According to the first aspect of the present disclosure, the door lock assembly further comprises a first microswitch, which is configured to indicate that the door is at the one or more intermediate positions; and a second microswitch, which is configured to indicate that the door is at the closed position, wherein the door lock slider is provided with a switch actuating part at the other end of the door lock slider opposite the door hook hole, and during the reciprocating process of the door lock slider, the first microswitch, the second microswitch and the switch actuating part are configured such that: the switch actuating part actuates the first microswitch when the door is at the one or more intermediate positions; or the switch actuating part actuates the second microswitch when the door is at the closed position.

According to the first aspect of the present disclosure, the door lock assembly further comprises a door lock box, wherein the door lock slider, the slider gear and the bias device are disposed in the door lock box.

According to the first aspect of the present disclosure, the door lock assembly is used for a dishwasher.

According to the first aspect of the present disclosure, the door lock assembly further comprises a driving device, and the driving device is configured to pull the door lock slider in the first linear direction.

According to the first aspect of the present disclosure, the driving device is connected to the door lock slider via a flexible component, and pulls the door lock slider in the first linear direction by means of the flexible component.

According to the first aspect of the present disclosure, the flexible component is connected to the slider linearly.

According to the first aspect of the present disclosure, the door lock assembly further comprises at least one constant pulley, and the at least one constant pulley is configured to change a moving path of the flexible component.

According to the first aspect of the present disclosure, the driving device comprises a driving gear, a gear teeth driving portion and a toothless portion being formed on a periphery of the driving gear, and the driving device being configured to be rotatable unidirectionally; and a driving rack, wherein the driving rack can reciprocate in the first linear direction or the second linear direction, and the driving rack is configured to drive the door lock slider to move in the first linear direction; and the driving gear and the driving rack are configured such that: the driving rack engages with the gear teeth driving portion when the driving rack drives the door lock slider to move in the first linear direction, so as to drive the door lock slider to move in the first linear direction; or a movement route of the driving rack corresponds to the toothless portion when the door lock slider moves in the second linear direction, so as to reduce resistance generated when the door lock slider moves in the second linear direction.

According to the first aspect of the present disclosure, the driving gear and the driving rack are configured such that: the driving rack engages with the gear teeth driving portion when the driving gear rotates within a first angle range; or the position of the driving rack corresponds to the toothless portion of the driving gear when the driving gear rotates within a second angle range.

According to the first aspect of the present disclosure, the driving gear and the driving rack are configured such that the driving rack moves in the first linear direction when the driving gear rotates within the first angle range, so as to drive the door lock slider to move in the first linear direction; and the door lock slider moves in the second linear direction and drives the driving rack to move in the second linear direction when the position of the driving rack corresponds to the toothless portion of the driving gear.

According to the first aspect of the present disclosure, the driving gear and the driving rack are configured such that the driving gear drives the driving rack to move from a start position to the closed position when the driving gear rotates within the first angle range; or the door lock slider drives the driving rack to move from the closed position to the start position when the driving gear is within the second angle range.

According to the first aspect of the present disclosure, the driving device further comprises: a driving motor, which is configured to drive the driving gear to rotate within the first angle range and the second angle range on a time-sharing basis.

According to a second aspect of the present disclosure, an electrical equipment is provided, having a door lock assembly according to the first aspect of the present disclosure and a door, the door having one or more intermediate positions and a closed position, wherein the door lock assembly is configured to drive the door to move between the one or more intermediate positions and the closed position.

According to a third aspect of the present disclosure, a driving device is provided, wherein the driving device is configured to drive a door lock assembly, the door lock assembly is configured to actuate a door of an electrical equipment, the door lock assembly comprises a door lock slider, and the driving device comprises: a driving gear and a driving rack, wherein a gear teeth driving portion and a toothless portion are formed on a periphery of the driving gear, and the driving gear is configured to be rotatable unidirectionally; the driving rack can reciprocate in the first linear direction and the second linear direction, and the driving rack is configured to drive the door lock slider to move in the first linear direction; the driving gear and the driving rack are configured such that the driving rack engages with the gear teeth driving portion when the driving rack drives the door lock slider to move in the first linear direction, so as to drive the door lock slider to move in the first linear direction; or a movement route of the driving rack corresponds to the toothless portion when the door lock slider moves in the second linear direction, so as to reduce resistance generated when the door lock slider moves in the second linear direction.

According to the third aspect of the present disclosure, the driving gear and the driving rack are configured such that: the driving rack engages with the gear teeth driving portion when the driving gear rotates within a first angle range; or a position of the driving rack corresponds to the toothless portion of the driving gear when the driving gear rotates within a second angle range.

According to the third aspect of the present disclosure, the driving gear and the driving rack are configured such that: the driving rack moves in the first linear direction when the driving gear rotates within the first angle range, so as to drive the door lock slider to move in the first linear direction; and the door lock slider moves in the second linear direction and drives the driving rack to move in the second linear direction when the position of the driving rack corresponds to the toothless portion of the driving gear.

According to the third aspect of the present disclosure, the driving gear and the driving rack are configured such that: the driving gear drives the driving rack to move from a start position to a closed position when the driving gear rotates within the first angle range; or the door lock slider drives the driving rack to move from the closed position to the start position when the driving gear is within the second angle range.

According to the third aspect of the present disclosure, the driving device further comprises a driving motor, which is configured to drive the driving gear to rotate within the first angle range and the second angle range on a time-sharing basis, wherein when the driving gear is at the closed position, the driving motor can rotate the driving gear to the toothless portion.

According to the third aspect of the present disclosure, the door lock slider is provided with a door hook hole at one end of the door lock slider, and the door hook hole is configured to accommodate a door hook.

According to the third aspect of the present disclosure, the driving device is connected to the door lock slider via a flexible component, and pulls the door lock slider in the first linear direction by means of the flexible component, wherein the flexible component is connected between one end of the driving rack and the other end of the door lock slider opposite the door hook hole.

According to the third aspect of the present disclosure, the door lock assembly further comprises at least one constant pulley, and the at least one constant pulley is configured to change a moving path of the flexible component.

According to the third aspect of the present disclosure, the door lock slider is configured to reciprocate in the first linear direction or the second linear direction in a length direction of the door lock slider, the movement of the door lock slider in the second linear direction is driven by a bias force provided by a bias device, and the bias device is arranged inside the door lock assembly.

According to the third aspect of the present disclosure, the door has an open position, a closed position and one or more intermediate positions; the first linear direction of the door lock slider corresponds to a moving direction of the door from the one or more intermediate positions to the closed position; and the second linear direction of the door lock slider corresponds to a moving direction of the door from the closed position to the one or more intermediate positions, wherein the one or more intermediate positions are located between the open position and the closed position.

According to a fourth aspect of the present disclosure, an electrical equipment is provided, having a driving device according to the third aspect of the present disclosure, a door lock assembly and a door, wherein the driving device is configured to drive the door lock assembly, and the door lock assembly is configured to actuate the door.

Some of the additional aspects and advantages of the present disclosure will be set forth in the following description, and some will become apparent from the following description, or be learned by practice of the present disclosure.

DESCRIPTION OF PREFERRED EMBODIMENTS

Various specific implementations of the present disclosure will be described below with reference to the accompanying drawings which constitute part of the present disclosure, but would not limit the scope of the present disclosure. It should be understood that although the terms indicating directions, such as “upper”, “lower”, “left”, “right”, “front” and “rear”

are used in the present disclosure to describe orientations of structural parts and elements in various examples of the present disclosure, these terms are used herein only for ease of illustration and are determined based on the exemplary orientations shown in the accompanying drawings. Since the embodiments of the present disclosure can be arranged in different directions, these terms indicating directions are merely illustrative and should not be considered as limitations.

The terms “first”, “second”, “third”, etc. used in the present disclosure are merely used to distinguish different objects, instead of indicating that there is any particular sequential relationship between these objects. The term “comprise/include” and derivatives thereof mean inclusion without limitation. Unless otherwise specified and limited, the terms “mounting”, “connecting” and “connection” should be understood broadly. For example, they may be a mechanical or electrical connection, internal communication between two elements, or a direct connection or indirect connection via an intermediate medium. For those of ordinary skills in the art, the specific meanings of the above terms can be understood according to specific cases. If possible, the same or similar reference signs used in the present disclosure refer to the same components.

Figure 6A:
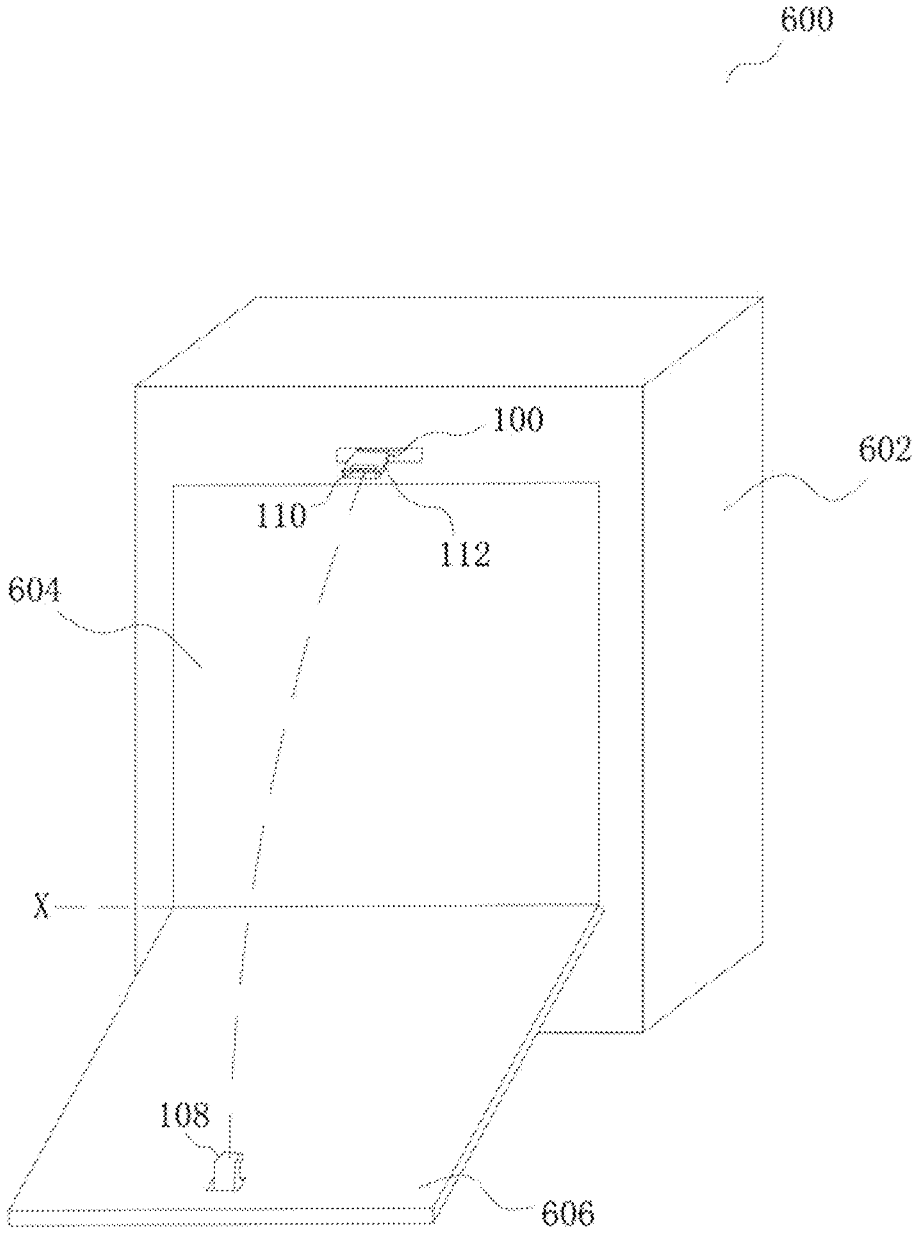
FIG. 6A is a schematic diagram of a dishwasher 600 with a door lock assembly 100 according to the present disclosure in an open position.
Figure 6B:
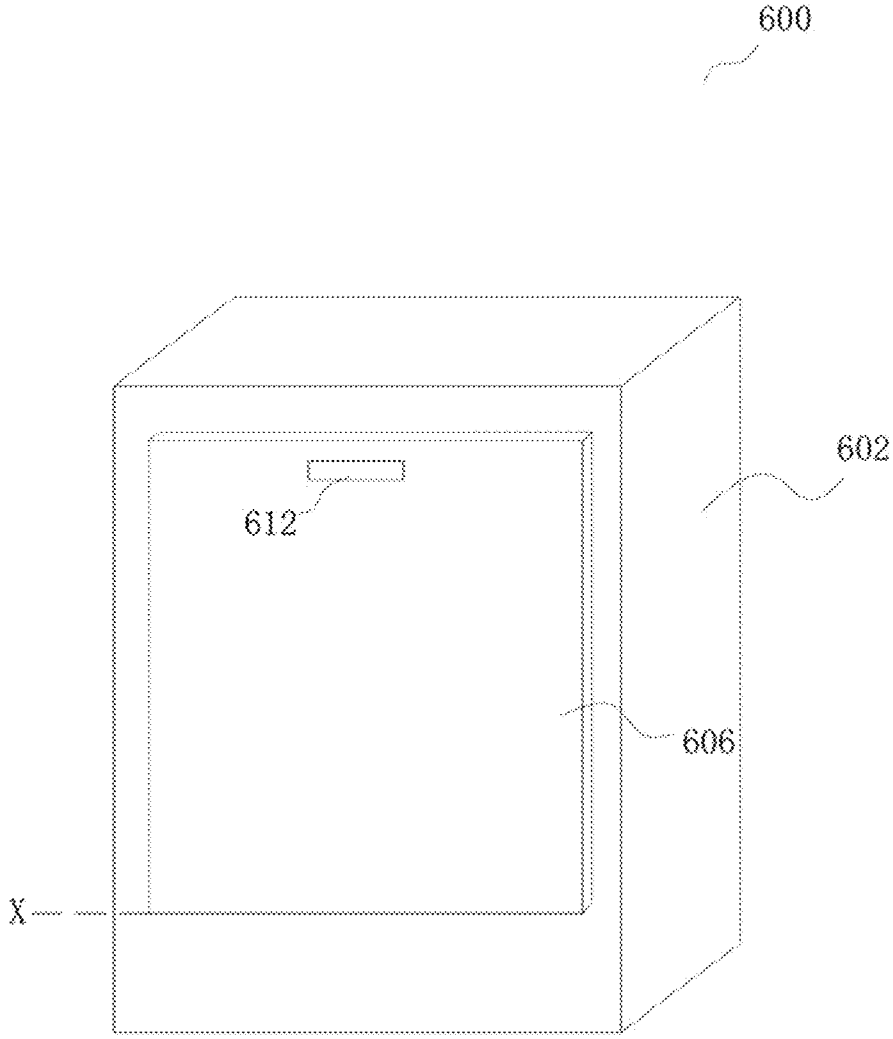
FIG. 6B is a schematic diagram of the dishwasher 600 shown in FIG. 6A in a closed position.
Figure 6C:
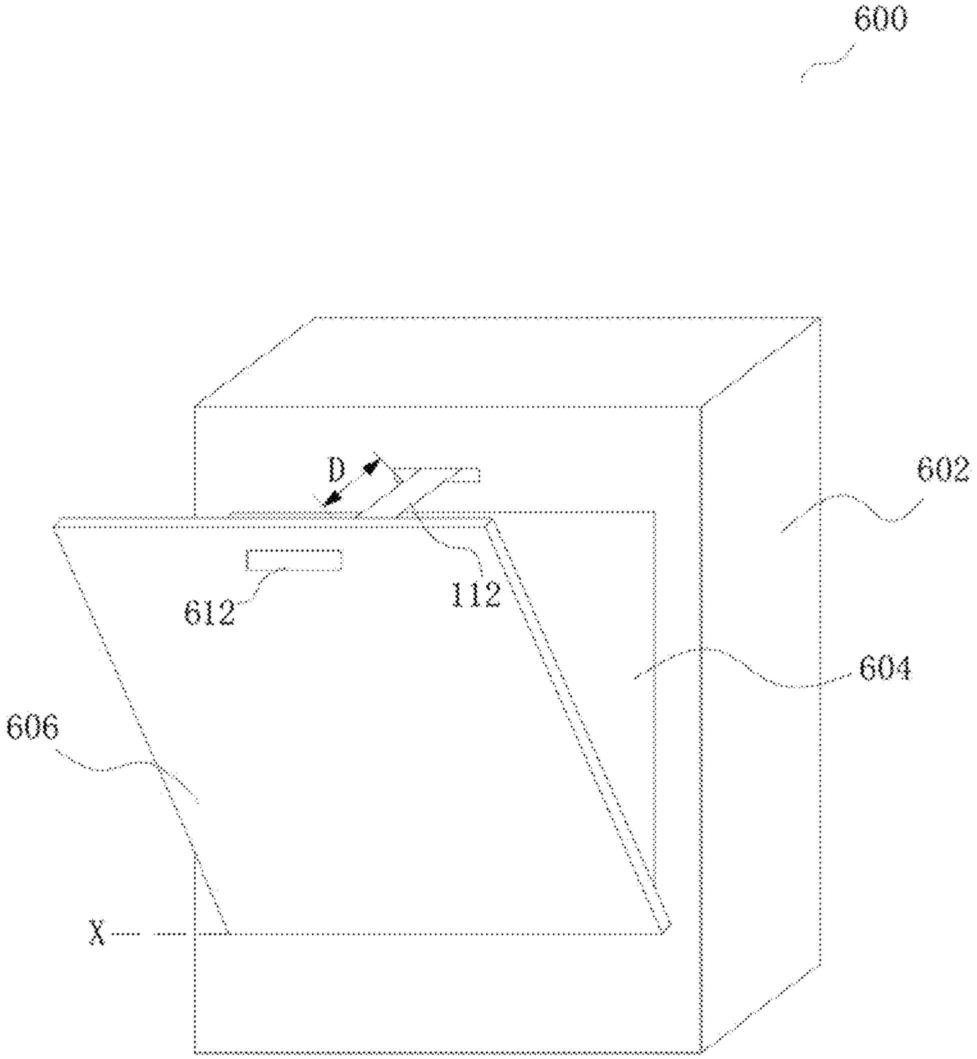
FIG. 6C is a schematic diagram of the dishwasher 600 shown in FIG. 6A in a heat dissipation position.

In order to make the description of the present disclosure easy to understand, a door of an electrical equipment (especially a door of a dishwasher) according to the present disclosure has at least three positions, namely: an open position (fully-open position, see the position of a door 606 in FIG. 6A), a closed position (see the position of the door 606 in FIG. 6B) and one or more intermediate positions, such as a heat dissipation position (partially-open position, see the position of the door 606 in FIG. 6C), wherein the heat dissipation position is located between the open position and the closed position. When the door moves from the closed position to the heat dissipation position, a door hook is kept in a door hook hole of a door lock slider, so when the door returns to the closed position from the heat dissipation position, the door hook is still kept in the door hook hole of the door lock slider. However, if the door is at the open position, the door hook is disengaged from the door hook hole of the door lock slider. The door can be moved from the closed position to the open position by pulling a door bolt on an outer side of the door to disengage the door hook from the door hook hole, and the door can be moved from the open position to the closed position by pushing the door from the outer side of the door to make the door hook collide and engage with the door hook hole. The movement of the door between the heat dissipation position and the closed position can be achieved by the movement of a push rod (or slider) attached to the door hook hole between the extended position and the retracted position, and the specific implementations are described in detail below.

Figure 1A:
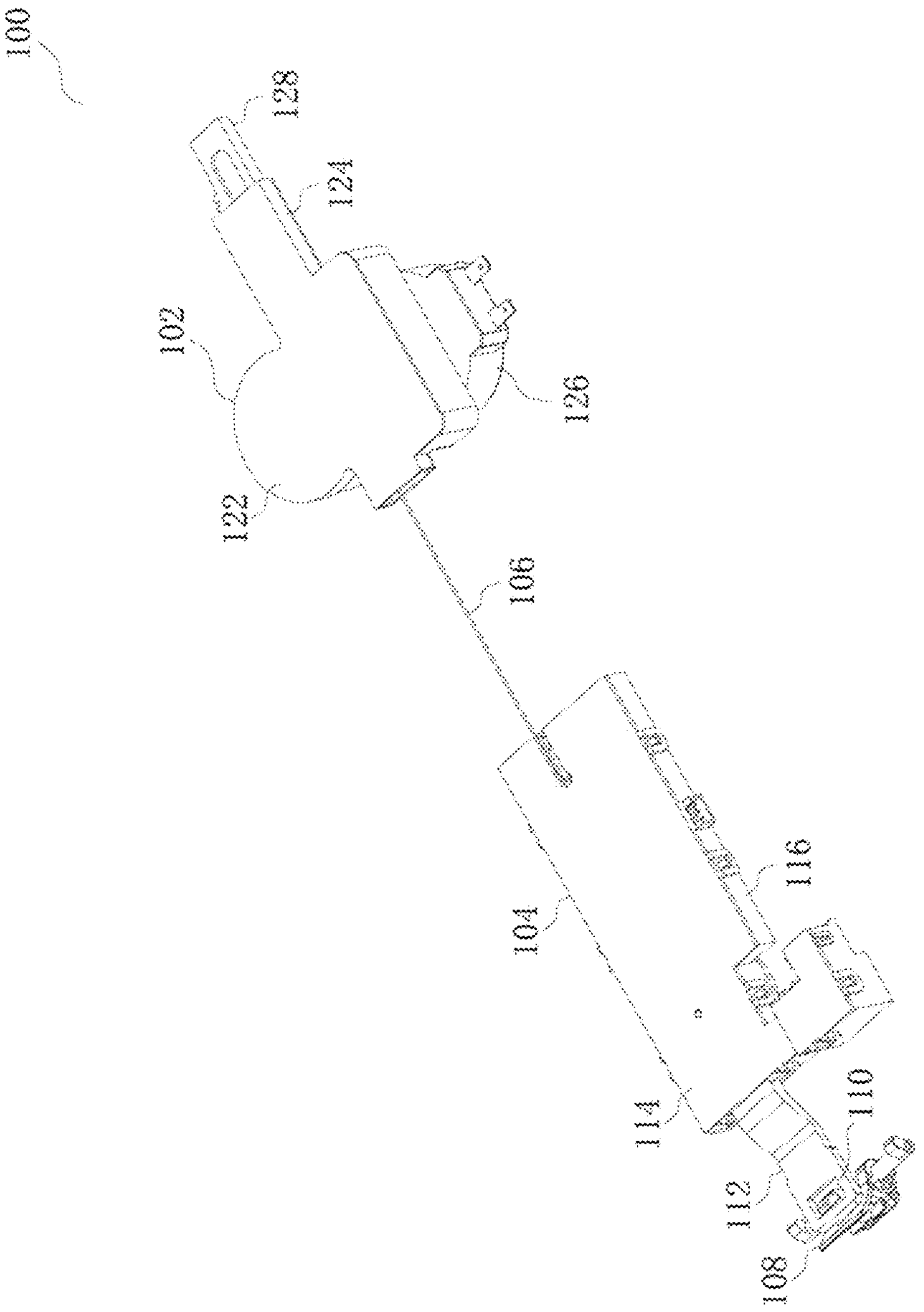
FIG. 1A is a perspective view of a first embodiment 100 of a door lock assembly according to the present disclosure.
Figure 1B:
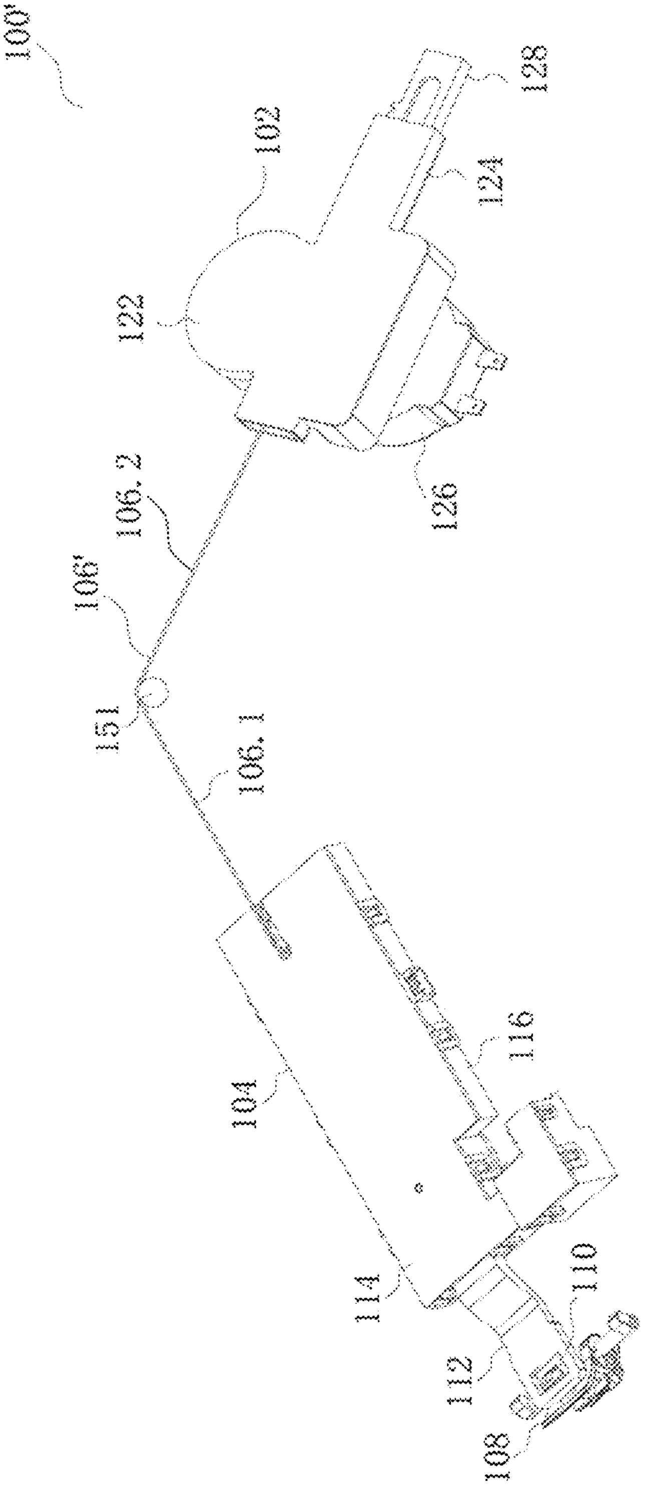
FIG. 1B is a perspective view of a second embodiment 100' of a door lock assembly according to the present disclosure.
Figure 1C:
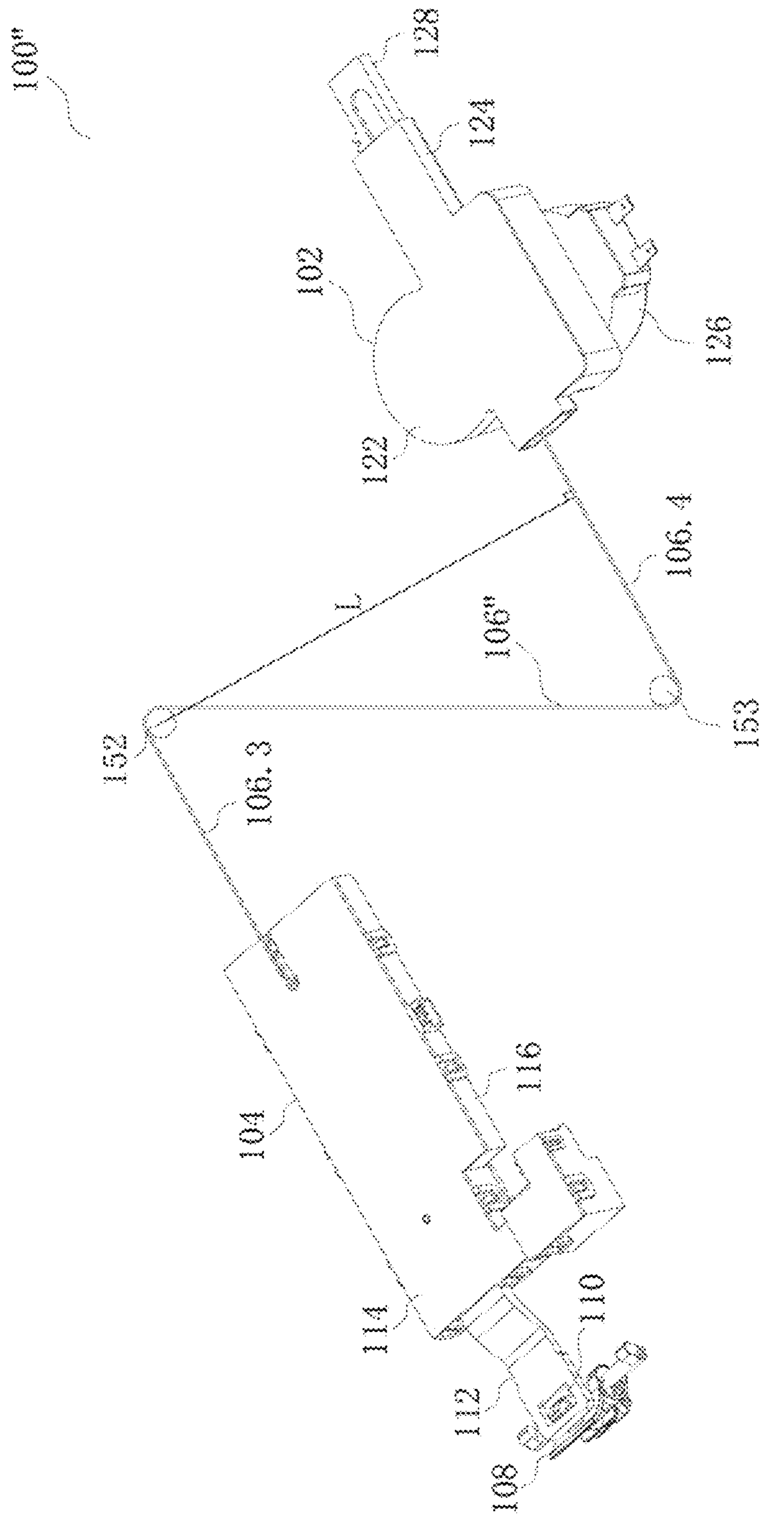
FIG. 1C is a perspective view of a third embodiment 100" of a door lock assembly according to the present disclosure.

FIGS. 1A-1C are perspective views of three embodiments 100, 100' and 100" of a door lock assembly according to the present disclosure. Flexible components as shown, such as pulling strings 106, 106' and 106", connect a door lock slider 112 to a driving rack 128 in the door lock assembly via three different paths. Components other than the pulling strings 106, 106' and 106" in the second embodiment 100' and the third embodiment 100" of the door lock assembly are configured in the same manner as those in the first embodiment 100, and the description of these same components is not repeated. However, for those of ordinary skill in the art, the pulling strings 106, 106' and 106" in the door lock assembly according to the present disclosure are not limited to the three embodiments shown in FIGS. 1A-1C, and the pulling strings may have different moving paths through reasonable arrangements of pulling string pulleys. Therefore, there are various other implementations of the door lock assembly according to the present disclosure.

FIG. 1A is a perspective view of a first embodiment 100 of a door lock assembly according to the present disclosure, showing main components of the door lock assembly according to the present disclosure.

As shown in FIG. 1A, the door lock assembly 100 comprises a door lock box 104, a driving device 102 and a pulling string 106. The door lock box 104 comprises a door lock box upper cover 114 and a door lock box housing 116, and an elongated door lock slider 112 is arranged within the door lock box. The door lock slider 112 can reciprocate linearly relative to the door lock box 104 in a length direction of the door lock slider. A door hook hole 110 is provided at one end (the left end shown in the figure) of the door lock slider 112, and is used to receive a door hook 108 mounted on a door and keep engaged with the door hook 108, and a slider pulling string receiving hole 142 (see FIG. 1D) is provided at the other end (the right end shown in the figure) of the door lock slider 112, and is used to connect the pulling string 106.

The driving device 102 comprises a driving device upper cover 122 and a driving device housing 124, and a driving rack 128 is arranged in the driving device. The driving rack 128 can reciprocate linearly relative to the driving device 102. A rack pulling string receiving hole 144 (see FIG. 1D) is provided at one end (left end shown in the figure) of the driving rack 128, and is used to connect the pulling string 106. A driving motor 126, preferably a servo motor, is further arranged outside of the driving device 102, and is configured to drive the driving rack 128 to move rightward (see a first linear direction E in FIGS. 5A-5G). It can be seen that the door lock slider 112 and the driving rack 128 may be connected together by means of the pulling string 106. The leftward movement of the door lock slider 112 relative to the door lock box 104 (see a second linear direction F in FIGS. 5A-5G for details) can drive the driving rack 128 to move leftward relative to the driving device 102, and the rightward movement of the driving rack 128 relative to the driving device 102 can drive the door lock slider 112 to move rightward relative to the door lock box 104. The leftward movement of the door lock slider 112 is driven by a bias device (coil spring) 132 (see FIG. 1D).

FIG. 1B is a perspective view of the second embodiment 100' of the door lock assembly according to the present disclosure, showing that a constant pulley 151 is provided on a moving path of a pulling string, the pulling string is used to connect the door lock slider 112 to the driving rack 128.

As shown in FIG. 1B, the second embodiment 100' of the door lock assembly differs from the first embodiment 100 only in the arrangement of the moving path of the pulling string. In the second embodiment 100', a constant pulley 151 is arranged on the moving path of the pulling string 106', and the constant pulley 151 achieves an effect of changing a moving direction of the pulling string 106'. As long as extension directions of sections 106.1 and 106.2 of the pulling string 106' are kept consistent with extension (movement) directions of the door lock slider 112 and the driving rack 128 respectively by properly setting the position of the constant pulley 151, no component force inconsistent with the moving direction will be generated on the door lock slider 112 and the driving rack 128, which otherwise affects their movement.

FIG. 1C is a perspective view of the third embodiment 100" of the door lock assembly according to the present disclosure, showing that two constant pulleys 152 and 153 are arranged on a moving path of a pulling string, the pulling string is used to connect the door lock slider 112 to the driving rack 128.

As shown in FIG. 1C, the third embodiment 100" of the door lock assembly differs from the previous two embodiments only in the arrangement of the moving path of the pulling string. In the third embodiment 100", constant pulleys 152 and 153 are arranged on the moving path of the pulling string 106", so the moving path of the pulling string 106" changes directions twice, and finally a section 106.4 of the pulling string 106" close to the driving device 102 is deviated by a distance L relative to a section 106.3 of the pulling string 106 close to the door lock box 104. Similar to the second embodiment 100', as long as extension directions of sections 106.3 and 106.4 of the pulling string 106" are kept consistent with extension (movement) directions of the door lock slider 112 and the driving rack 128 respectively by properly setting the position of the constant pulley 152,153, no component force inconsistent with the moving direction will be generated on the door lock slider 112 and the driving rack 128, which otherwise affects their movement.

As shown in FIGS. 1B and 1C above, the moving direction of the pulling string in the door lock assembly is reasonably changed by arranging one or two constant pulleys, so the position arrangement of the door lock box 104 and the driving device 102 is more flexible, and mounting requirements for different electrical equipment structures and spaces can be met. The first embodiment 100 of the door lock assembly is taken as an example to further describe the detailed structure and function of the door lock assembly.

It may be noted that in the embodiment of FIG. 1A, the pulling string 106 pulls the door lock slider 112 in a linear manner, and the door lock box 104 and the driving device 102 are colinear. In the embodiments of FIGS. 1B-1C, the pulling string 106 pulls the door lock slider 112 in a direction-changing manner, and the door lock box 104 and the driving device 102 are not colinear, such that an assembly space in an electrical equipment can be flexibly utilized.

Figure 1D:
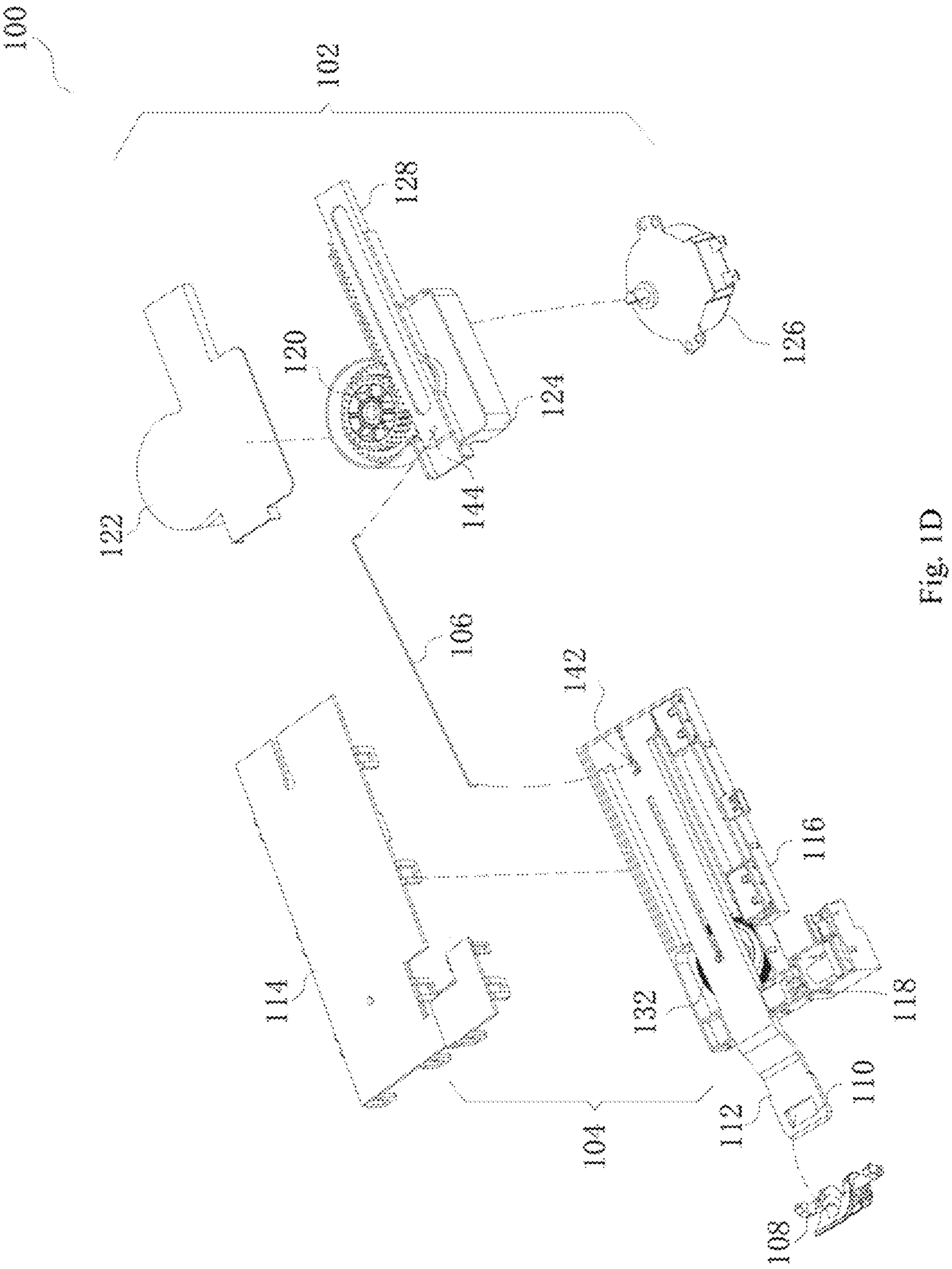
FIG. 1D is an exploded view of the door lock assembly 100 shown in FIG. 1A.

FIG. 1D is an exploded view of the door lock assembly 100 shown in FIG. 1A. In FIG. 1D, the door lock box upper cover 114 of the door lock box 104 and the driving device upper cover 122 of the driving device 102 in FIG. 1A are removed, such that more components inside the door lock box 104 and the driving device 102 can be shown.

As shown in FIG. 1D, a door lock slider 112 is arranged inside the door lock box 104. As viewed from the top, the door lock slider 112 is arranged on an upper portion of the door lock box 104, and a bias device 132, preferably a coil spring, which is cooperatively connected to the door lock slider 112, is further arranged below the door lock slider 112. The coil spring 132 can generate a leftward bias force on the door lock slider 112 by means of its own torsion, such that the door lock slider 112 has a tendency to move from a retracted position to an extended position. A locking pin assembly 118 arranged perpendicular to the door lock slider 112 is further arranged in the door lock box 104, and is configured to lock the door lock slider 112 to the retracted position shown in FIG. 1A (corresponding to the closed position of the door). A driving gear 120 is further arranged inside the driving device 102, and the teeth of the driving gear can engage with the driving rack 128. The driving motor 126 can actuate the driving gear 120 to rotate and drive the driving rack 128 to move linearly through engagement transmission between the driving gear 120 and the driving rack 128.

For those of ordinary skill in the art, in some other embodiments, for example, when there is an enough space inside the electrical equipment to arrange the door lock assembly 100, it is possible to directly arrange the door lock slider 112 and the driving rack 128 in the same moving direction through rigid connection without arranging the pulling string 106.

Figure 2A:
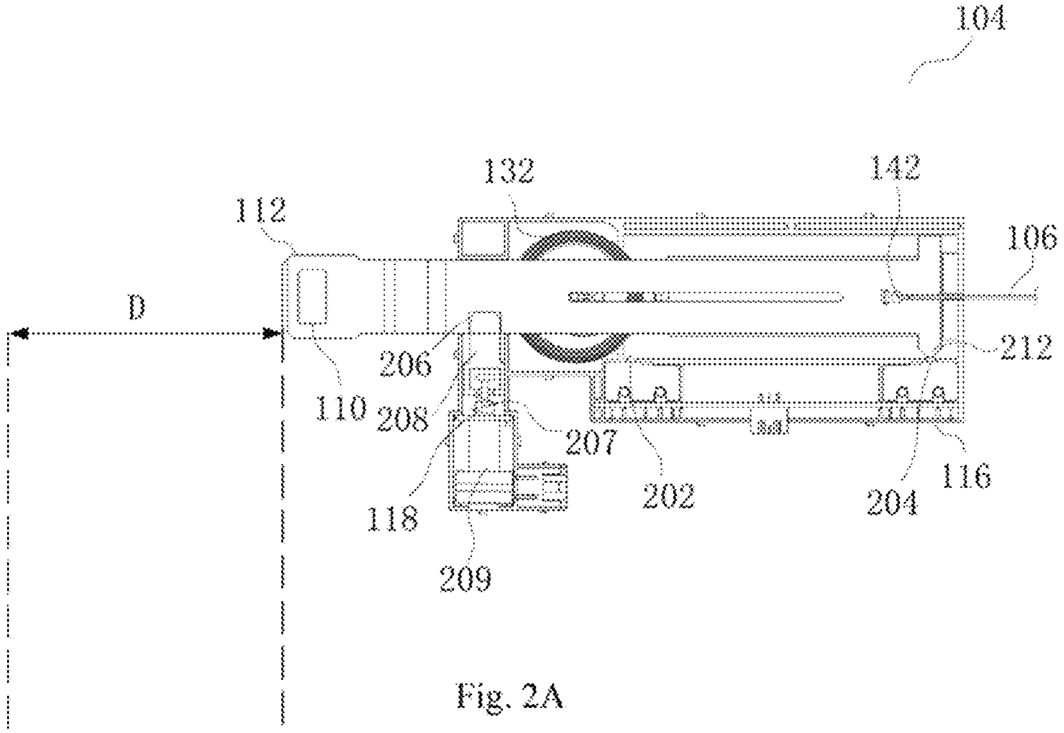
FIG. 2A is a top view of a door lock slider 112 in a door lock box 104 in a retracted position, in which a door lock box upper cover 114 of the door lock box 104 is hidden to show more components inside the door lock box 104.
Figure 2B:
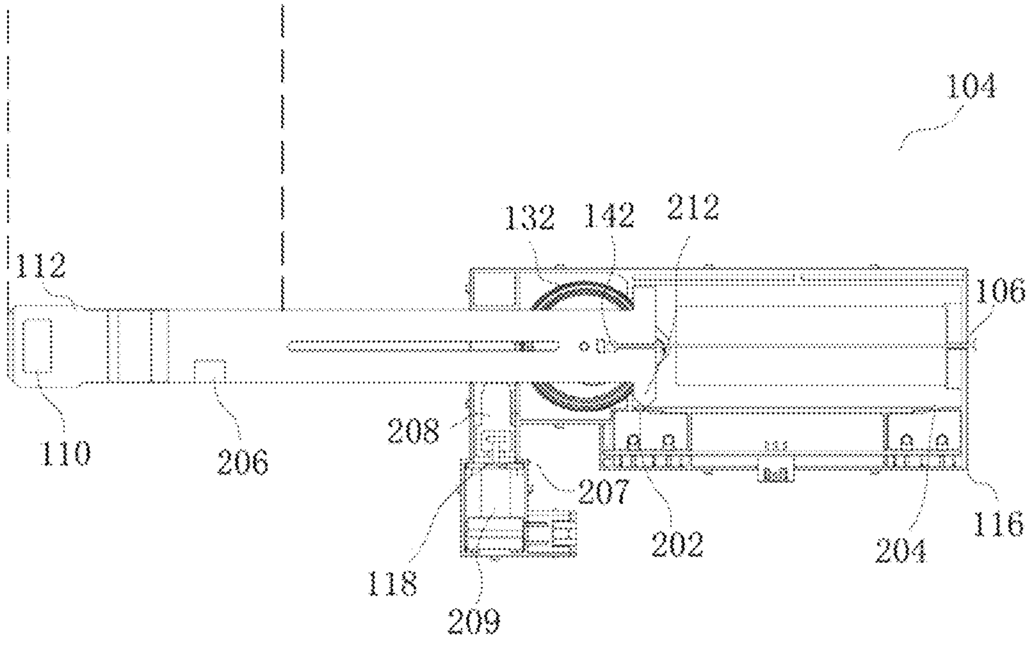
FIG. 2B is a top view of the door lock slider 112 in the door lock box 104 at an extended position, in which the door lock box upper cover 114 of the door lock box 104 is hidden to show more components inside the door lock box 104.

FIGS. 2A-2B are top views showing the door lock slider 112 in the door lock box 104 in a retracted position and an extended position, respectively. In FIGS. 2A-2B, the door lock box upper cover 114 of the door lock box 104 is hidden, so as to show a cooperation relationship between various components inside the door lock box 104 from a top view, and to show a moving distance of the door lock slider 112 in the retracted position and the extended position, so as to show a gap distance by which the door of the electrical equipment can be opened.

As shown in FIGS. 2A-2B, a first microswitch 202 and a second microswitch 204 that are configured to detect the position of the door lock slider 112 are arranged inside the door lock box 104. Correspondingly, a switch actuating part 212 protruding downward is arranged at a right end of the door lock slider 112, and the door lock slider 112 can linearly reciprocate in a corresponding slider groove in the door lock box 104, so that the switch actuating part 212 of the door lock slider 112 also reciprocates with the movement of the door lock slider 112.

As shown in FIG. 2A, a device for detecting the position of the door lock slider 112 is arranged in the door lock assembly 100 according to the present disclosure. As an embodiment, in the present disclosure, the first microswitch 202 and the second microswitch 204 are used to detect the position of the door lock slider 112. Specifically, when the door lock slider 112 moves to the retracted position, the switch actuating part 212 of the door lock slider 112 is in contact with the second microswitch 204. In this case, the second microswitch 204 can send a signal that the door lock slider 112 is at the retracted position to a control device (not shown in the figure) of the electrical equipment, so as to execute a control program for a next operation. Similarly, as shown in FIG. 2B, when the door lock slider 112 moves to the extended position, the switch actuating part 212 of the door lock slider 112 is in contact with the first microswitch 202. In this case, the first microswitch 202 can send a signal that the door lock slider 112 is at the extended position to the control device of the electrical equipment, so as to execute the control program for a next operation. For those of ordinary skill in the art, it is possible not to arrange the first microswitch 202 and the second microswitch 204 in the door lock box 104. For example, the movement of the door lock slider 112 may be limited by providing a corresponding mechanical limiting structure in the door lock box 104, and a moving distance of the slider may be controlled by controlling a rotational speed and rotational duration of the servo motor.

Still referring to FIGS. 2A-2B, when the door lock slider 112 moves from the retracted position to the extended position, the door lock slider 112 moves leftward by a distance D. Since the door hook 108 always keeps in engagement with the door hook hole 110 of the door lock slider 112 during the movement of the door lock slider 112 from the retracted position to the extended position, the door hook 108 and the door of the electrical equipment also correspondingly move from the closed position to the heat dissipation position about a pivot axis X of the door (see FIG. 6C for details), and the door is also pushed out by a distance of D, that is, the openness of the door gap is D (see the openness D of the door in FIG. 6C).

Still referring to FIGS. 2A-2B, the locking pin assembly 118 inside the door lock box 104 comprises a locking pin 208, a locking pin spring 207, and an actuator 209, preferably a locking pin coil 209, wherein the locking pin spring 207 is arranged between the locking pin 208 and the locking pin coil 209, and can provide an elastic force (restoring force) for the locking pin 207 to move away from the locking pin coil 209. The locking pin coil 209 can receive a pulse signal from the control device (not shown in the figure), thereby providing an electromagnetic force for the locking pin 207 to move close to the locking pin coil 209. At the retracted position of the door lock slider 112, a pin slot 206 is provided below the door lock slider 112 at a position corresponding to the locking pin 208, and is configured to receive the inserted locking pin 208. Specifically, at the retracted position of the door lock slider 112 is pulled back, if no pulse signal is provided, the locking pin 208 is inserted (ejected) into the pin slot 206 below the door lock slider 112 under the action of the locking pin spring 207, thereby completing the locking of the door lock slider 112. As shown in FIG. 2B, at a position other than the retracted position of the door lock slider 112, since the locking pin 208 cannot be aligned with the pin slot 206, the locking pin 208 cannot be inserted into the pin slot 206 but is kept at an exit position. When no locking pin 208 is inserted into the pin slot 206, the structure of the present disclosure makes the movement of the door lock slider 112 subjected to very low resistance, and the door lock slider 112 is in a free state and can easily slide.

Figure 3A:
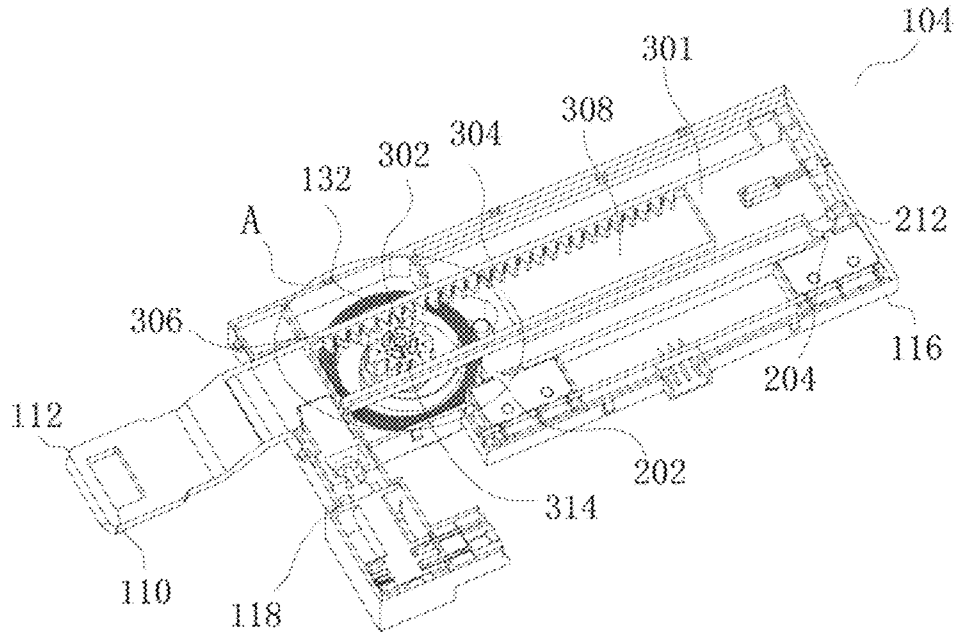
FIG. 3A is an internal perspective view of the door lock box 104 shown in FIG. 1D, in which the door lock box upper cover 114 of the door lock box 104 is hidden to show more features on an inner side of the door lock slider 112.
Figure 3B:
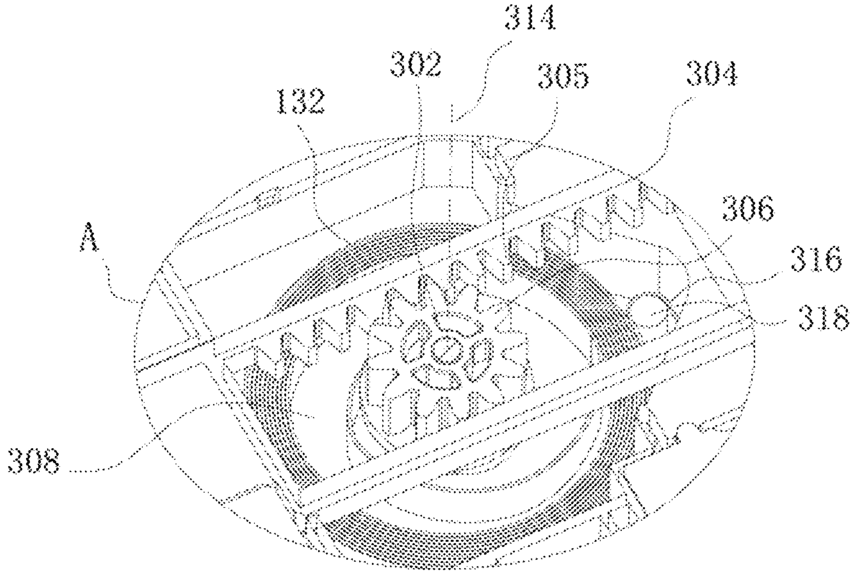
FIG. 3B is a partial enlarged view of the door lock slider 112 shown in FIG. 3A.
Figure 3C:
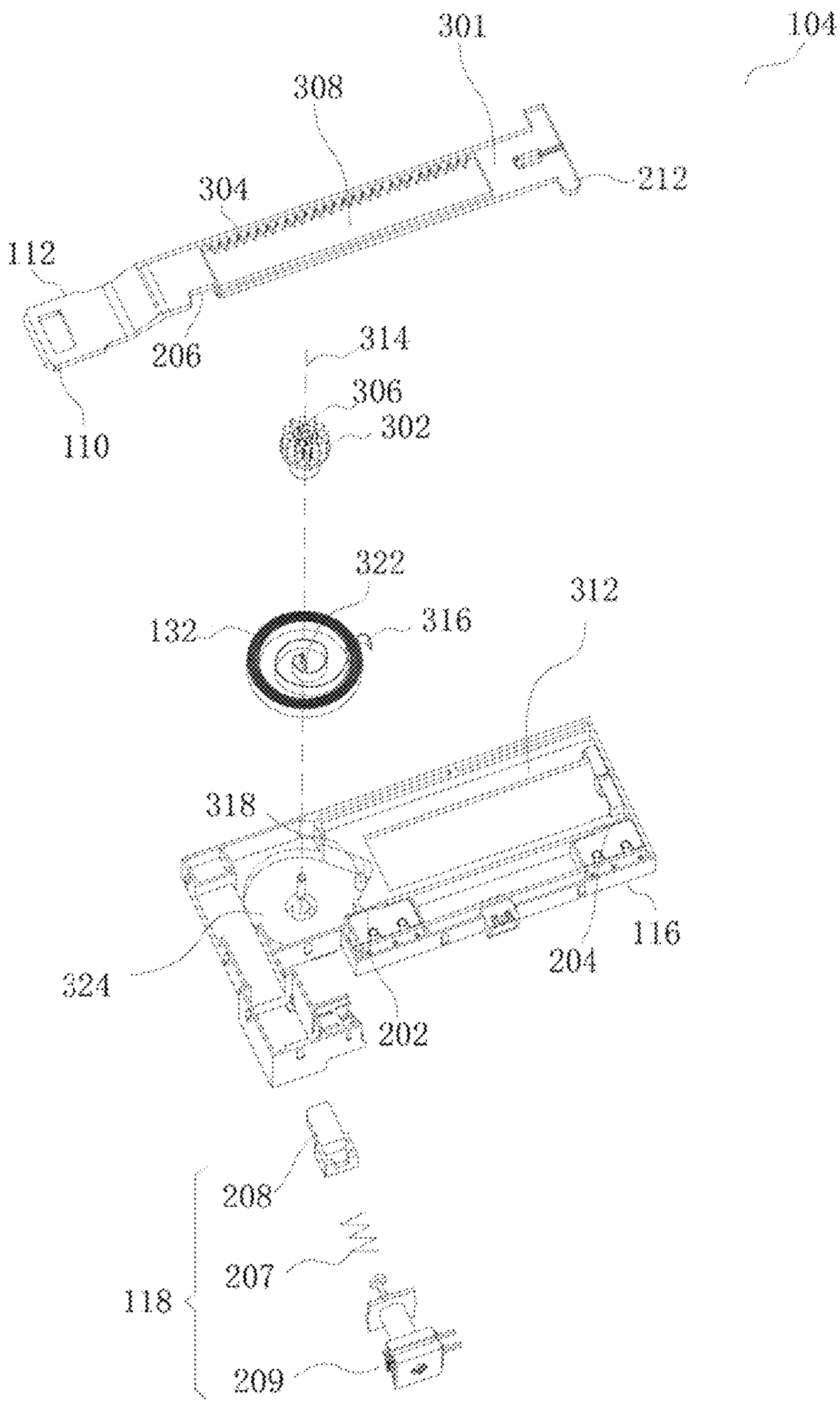
FIG. 3C is a mounting exploded view of the door lock box 104 shown in FIG. 3A.

FIG. 3A is an enlarged internal perspective view of the door lock box 104 shown in FIG. 1D, in which the door lock box upper cover 114 of the door lock box 104 is hidden to show more features inside the door lock slider 112. FIG. 3B is a partial enlarged view of the door lock slider 112 shown in FIG. 3A as detailed in circle A in this Figure, to more clearly illustrate a cooperation relationship between the door lock slider 112 and the coil spring 132. FIG. 3C is a mounting exploded view of the door lock box 104 shown in FIG. 3A, to show a mounting relationship between various components inside the door lock box 104.

As shown in FIGS. 3A-3B, the door lock slider 112 is provided with a slider body 301 and a slider groove 308 is provided in a length direction of the slider body 301, wherein a slider rack 304 is arranged on a side of the slider groove 308, and is provided with slider rack teeth 305. For those of ordinary skill in the art, the slider groove 308 can be provided with slider racks on two opposite sides thereof.

Still referring to FIGS. 3A-3B, a slider gear 302 is further arranged inside the door lock box 104, and is mounted in the slider groove 308. Slider gear teeth 306 are arranged on an upper portion of the slider gear 302, and a lower portion of the slider gear 302 is fixed to a center of the coil spring 132. The slider gear 302 has a same coil spring rotating shaft 314 as the coil spring 132, and the coil spring rotating shaft 314 extends into the slider groove 308, such that the slider gear 302 can be accommodated in the slider groove 308. Therefore, when rotating clockwise, the slider gear 302 drives the coil spring 132 to twist outward gradually from the center of the coil spring, such that the coil spring 132 can accumulate elastic potential energy. The slider gear 302 can engage with the slider rack teeth 305 of the slider rack 304 by means of the slider gear teeth 306 to form a rack-and-gear transmission structure. Therefore, the rotation of the slider gear 302 about the coil spring rotating shaft 314 can drive the slider rack 304 to move linearly, and the linear movement of the slider rack 304 can drive the slider gear 302 to rotate about the coil spring rotating shaft 314.

Still referring to FIGS. 3A-3B, the coil spring 132 is formed by curling a continuous sheet metal material. A slider gear retaining part 322 (see FIG. 3C for details) is arranged at a curl starting end, that is, the center of the coil spring 132, and is configured to retain the lower portion of the slider gear 302, and a curl tail end 316 of the coil spring 132 is fixed to the coil spring retaining part 318 on the door lock box housing 116. When the slider gear 302 rotates, the starting end of the coil spring 132 starts to curl through the connection between the lower portion of the slider gear 302 and the slider gear retaining part 322. Since the curl tail end 316 of the coil spring 132 is fixed to the coil spring retaining part 318 of the door lock box housing 116, the coil spring 132 as a whole will not rotate, but only interior of the coil spring 132 undergoes torsional deformation to accumulate elastic potential energy.

As shown in FIG. 3C, the coil spring 132 is disposed in a coil spring mounting groove 324 of the door lock box housing 116, such that the coil spring 132 can be twisted in a space defined by the coil spring mounting groove 324. The door lock slider 112 is disposed in a sliding groove 312 of the door lock box housing 116, such that the door lock slider 112 can be accommodated in the sliding groove 312 and move linearly leftward or rightward in a length direction of the sliding groove. Specifically, the door lock slider 112, the slider gear 302, the coil spring 132 and the door lock box housing 116 are sequentially placed in a vertical direction, showing a mounting relationship between these four components in the vertical direction. Similarly, the locking pin 208, the locking pin spring 207 and the locking pin coil 209 are sequentially placed in a front-rear direction, showing a mounting relationship between these three components in the front-rear direction.

It should be noted that the coil spring rotating shaft 314 extends into the slider groove 308, such that an acting point at which the slider gear 302 drives the door lock slider 112 coincides or substantially coincides with a moving path of the door lock slider 112, that is, the rotating shaft (i.e., the coil spring rotating shaft 314) of the slider gear 302 is arranged at a position close to the middle in a length direction of the door lock slider 112. Specifically, an acting point where the slider gear teeth 306 of the slider gear 302 engage with the slider rack teeth 305 of the door lock slider 112 is located inside the slider body 301 of the door lock slider 112. This arrangement enables the slider gear 302 to drive the door lock slider 112 to move with a minimal force or torque.

A moving operation process of the door lock slider 112 is described below with reference to FIGS. 3A-3C.

During movement of the door lock slider 112 from the retracted position to the extended position, a control device sends a pulse signal to the locking pin coil 209, to generate an electromagnetic actuating force on the locking pin 208, such that the locking pin 208 overcomes elasticity of the locking pin spring 207 to exit the pin slot 206 of the door lock slider 112 to unlock the door lock slider 112. The coil spring 132 releases the elastic potential energy accumulated thereby to drive the slider gear 302 to rotate counterclockwise. The counterclockwise rotation of the slider gear 302 drives the door lock slider 112 to move linearly leftward in the sliding groove 312 by means of the slider rack 304 engaging with the slider gear. On the contrary, during movement of the door lock slider 112 from the extended position to the retracted position, the door lock slider 112 moves linearly rightward in the sliding groove 312, to drive the slider gear 302 engaging with the slider rack to rotate clockwise by means of the slider rack 304. The clockwise rotation of the slider gear 302 can drive the coil spring 132 to twist and accumulate elastic potential energy. When the door lock slider 112 moves to the retracted position, the pin slot 206 is positionally aligned with the locking pin 208, such that the locking pin 208 can be ejected into the pin slot 206 under the action of the locking pin spring 207, thereby locking the door lock slider 112.

Figure 4A:
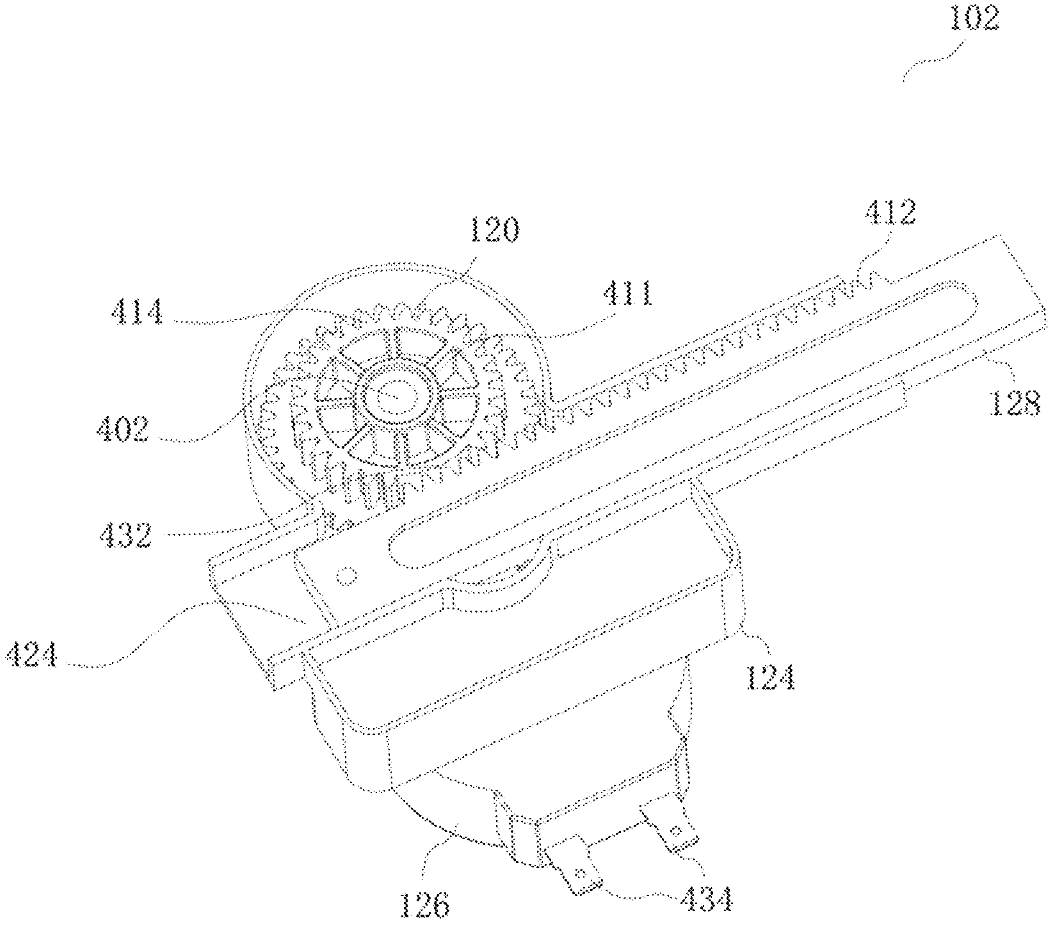
FIG. 4A is a perspective view of a driving device 102, in which a driving device upper cover 122 of the driving device 102 is hidden to show more components inside the driving device 102.
Figure 4B:
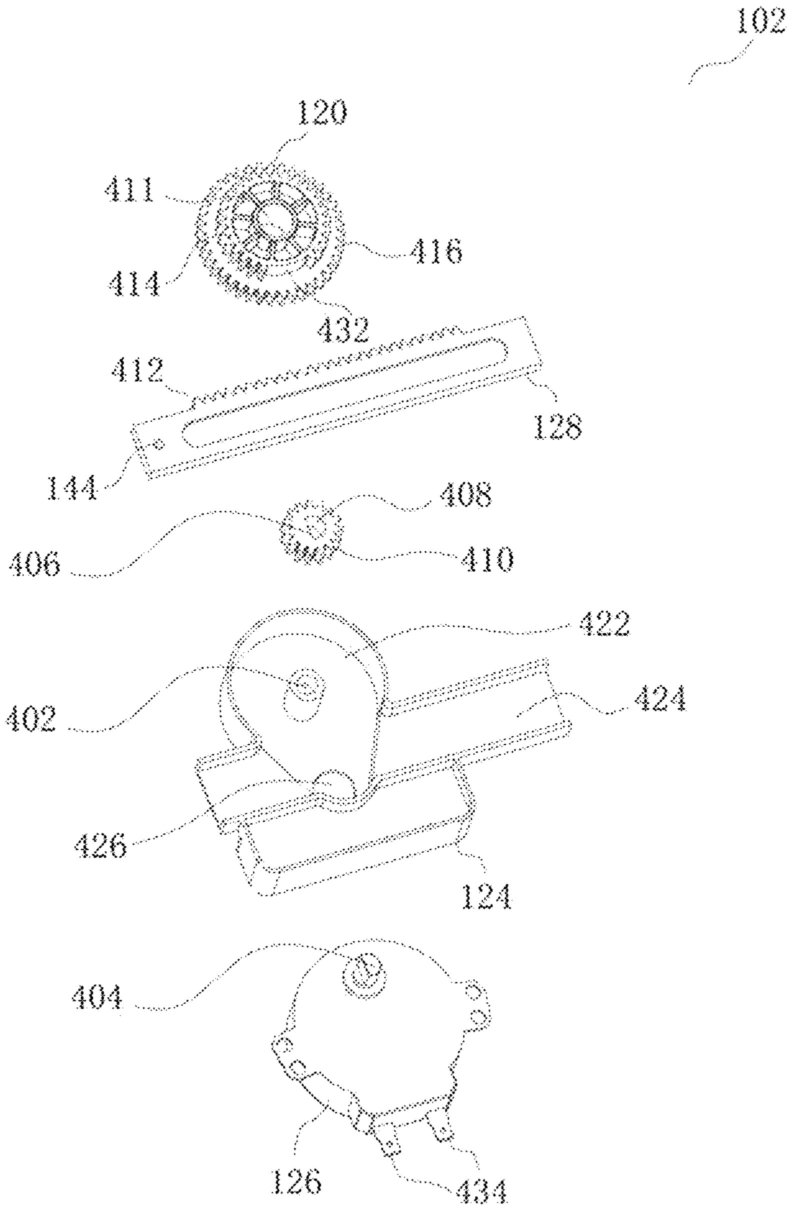
FIG. 4B is an exploded view of the driving device 102 shown in FIG. 4A.

FIG. 4A is an enlarged view of the driving device 102 shown in FIG. 1D, in which a driving device upper cover 122 of the driving device 102 is hidden to show more components inside the driving device 102. FIG. 4B is an exploded view of the driving device 102 shown in FIG. 4A, to show a mounting relationship between various components inside the driving device 102.

As shown in FIGS. 4A-4B, the driving device 102 comprises a driving gear 120, a driving rack 128, a transmission gear 406 and a driving motor 126, wherein the driving gear 120, the driving rack 128 and the transmission gear 406 are arranged inside the driving device housing 124 of the driving device 102, and the driving motor 126 is arranged outside the driving device housing 124. In FIG. 4B, the driving rack 128, the driving gear 120, the transmission gear 406, the driving device housing 124 and the driving motor 126 are vertically placed, showing a vertical assembly relationship between these components.

Specifically, the driving device housing 124 has a driving gear chamber 422, and a bottom protrusion 402 is provided at a center of the driving gear chamber 422 to define a rotation center of the driving gear 120, such that the driving gear 120 is limited to rotate inside the driving gear chamber 422. The driving device housing 124 is further provided with a driving rack sliding groove 424, such that the driving rack 128 can be accommodated in the driving rack sliding groove 424 and move linearly leftward or rightward in a length direction of the driving rack sliding groove.

Still referring to FIGS. 4A-4B, the driving gear 120 is of a round table structure in stepped form, and the round table structure has an upper portion and a lower portion with different radii. A first set of teeth 414 is provided on the upper portion of a periphery of the round table structure, and a second set of teeth 416 is arranged on the lower portion of the periphery of the round table structure. A hole 411 is provided at a center of the round table structure, such that the driving gear 120 can be mounted on the bottom protrusion 402 of the driving gear chamber 422 through the cone frustum hole 411, and thus the driving gear 120 can rotate about the bottom protrusion 402. Teeth 412 are arranged on an upper side of the driving rack 128, and can engage with the first set of teeth 414 of the driving gear 120. The driving gear 120 is provided with a neutral portion 432 at the first set of teeth 414, that is, the first set of teeth 414 has a smooth part without teeth within a certain angular range in a circumferential direction. When the driving gear 120 rotates to the position where the neutral portion 432 is aligned with the driving rack 128, the first set of teeth 414 of the driving gear 120 is disengaged from the teeth 412 of the driving rack 128, that is, the driving gear 120 and the driving rack 128 do not interfere with each other in movement.

As shown in FIG. 4B, the transmission gear 406 is provided with a transmission gear tooth portion 410 and a semicircular central hole portion 408, and the transmission gear tooth portion 410 may engage with the second set of teeth 416 of the driving gear 120. The semicircular central hole portion 408 is configured to cooperate with the driving motor 126 to transmit a torque of the driving motor 126. The driving motor 126 is provided with a motor output shaft 404 and a plug 434. A semi-circular protruding structure is provided at a distal end of the motor output shaft 404, and can cooperate with the semi-circular central hole portion 408 of the transmission gear 406, such that the rotation of the motor output shaft 404 of the driving motor 126 can drive the transmission gear 406 to rotate. Since the driving motor 126 is arranged outside the driving device housing 124, the motor output shaft 404 needs to pass through a driving shaft hole 426 at a bottom of the driving device housing 124 to extend into the driving device housing 124 to cooperate with the transmission gear 406. The plug 434 of the driving motor 126 may be electrically connected to an external power supply, thereby providing power for the rotation of the driving motor 126. Although a control circuit of the driving motor 126 is not shown in the figure, for those of at least ordinary skill in the art, the driving motor 126 may be a servo motor connected to the control device, and can drive the driving gear 120 to rotate in different angular ranges on a time-sharing basis, and a rotation angle, a rotation speed and rotation duration of the driving motor can be controlled by the control device.

A moving operation process of the driving rack 128 is described below with reference to FIGS. 4A-4B.

Under the control of a control device (not shown), the driving motor 128 outputs a clockwise torque by means of the motor output shaft 404, and the motor output shaft 404 passes through the driving shaft hole 426 at the bottom of the driving device housing 124 to transmit the clockwise torque to the transmission gear 406 cooperating with the motor output shaft, such that the transmission gear 406 rotates clockwise with the motor output shaft 404. The transmission gear 406 and the second set of teeth 416 of the driving gear 120 engage with each other (externally engage), such that the driving gear 120 rotates counterclockwise about the bottom protrusion 402, and the counterclockwise rotation of the driving gear 120 causes the driving rack 128 to move linearly in the driving rack sliding groove 424 of the driving device housing 124 through the engagement between the first set of teeth 414 and the driving rack 128. When the driving gear 120 rotates to a position where the neutral portion 432 of the driving gear is aligned with the driving rack 128, the first set of teeth 414 of the driving gear 120 is disengaged from the teeth 412 of the driving rack 128. In this case, since the driving gear 120 and the driving rack 128 do not interfere with each other in movement, the driving rack 128 is no longer driven to move.

Figure 5A:
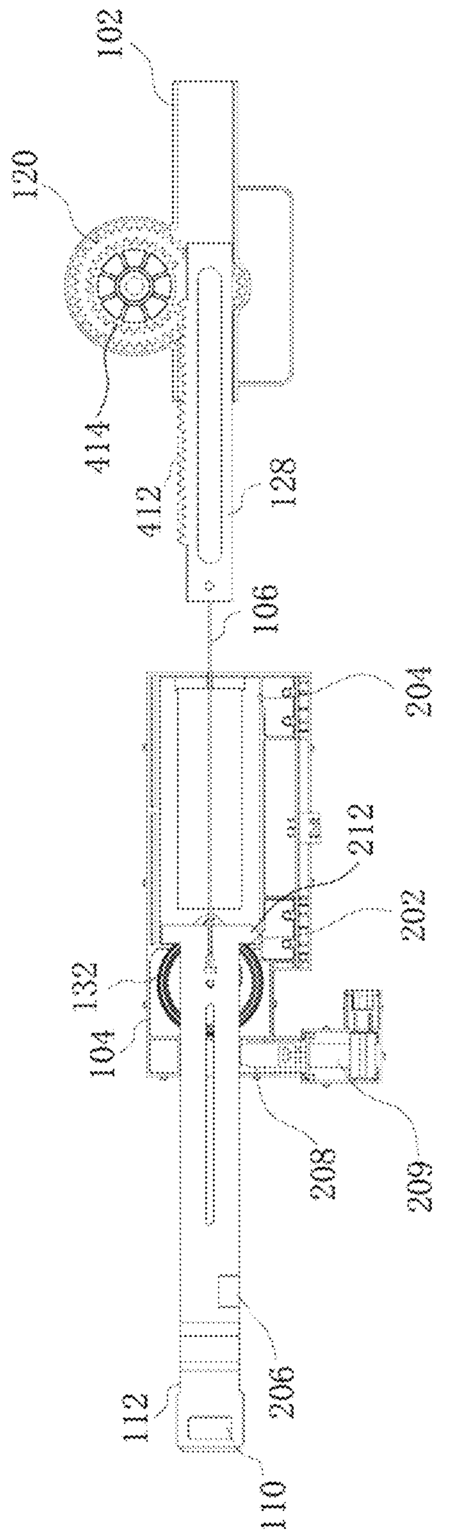
FIGS. 5A-5G are schematic diagrams showing movement of a door lock assembly 100 according to the present disclosure between an extended position and a retracted position.
Figure 5B:
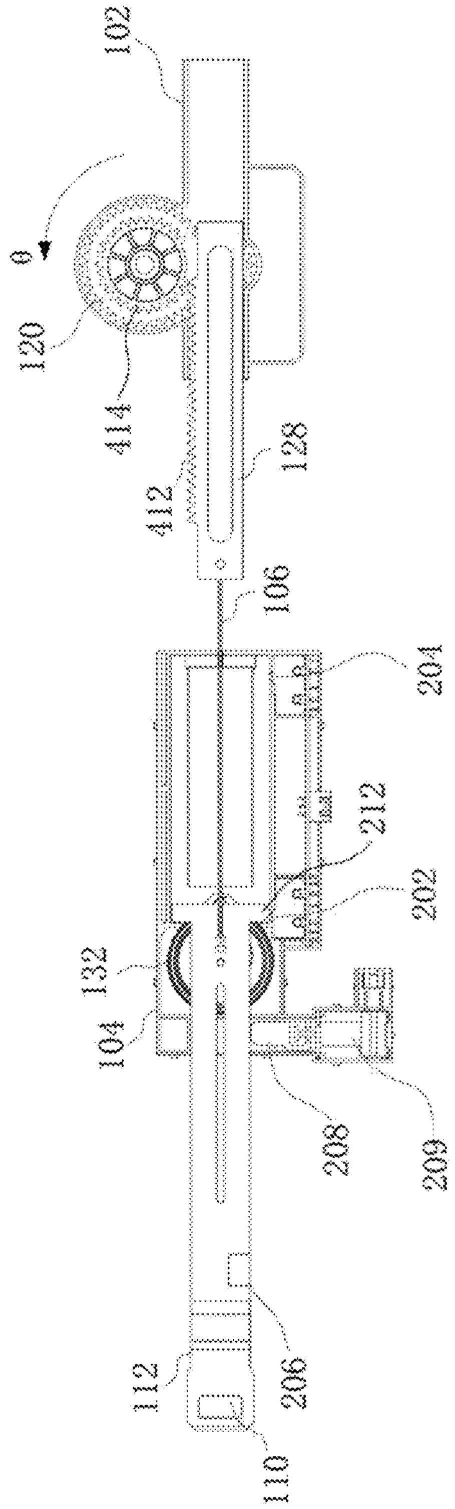
Figure 5C:
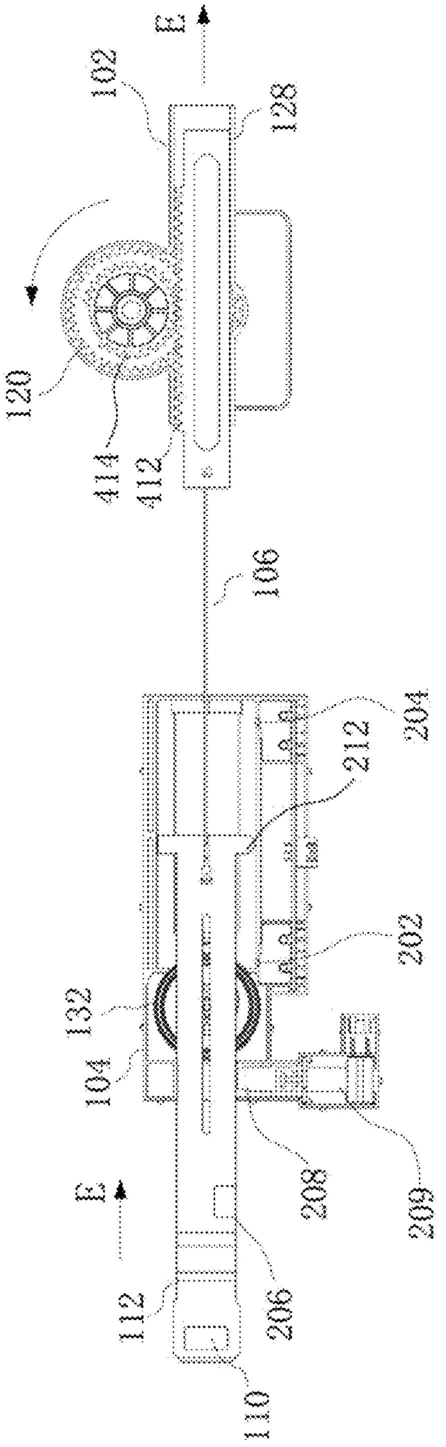
Figure 5D:
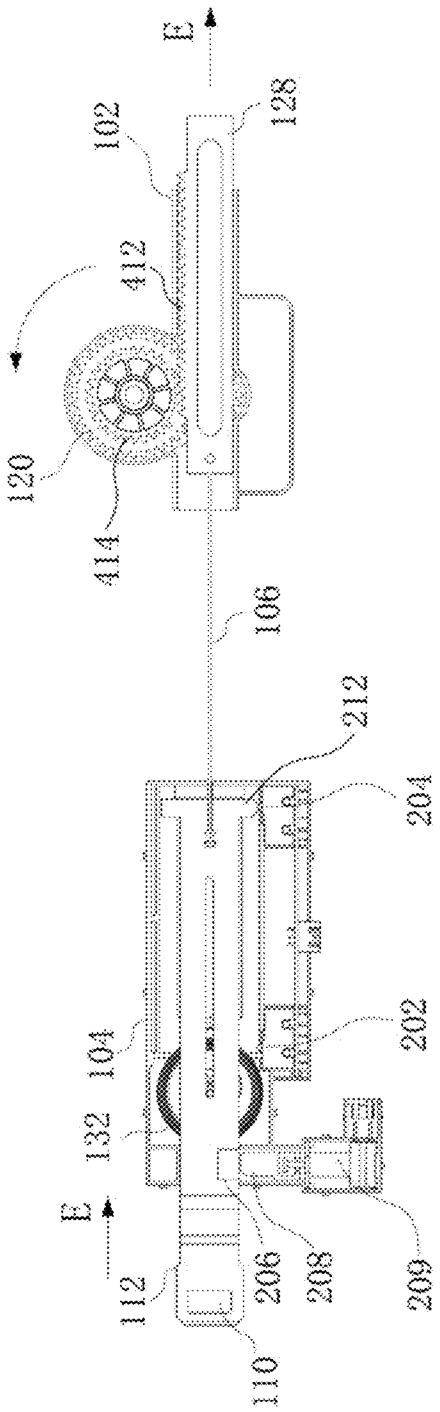
Figure 5E:
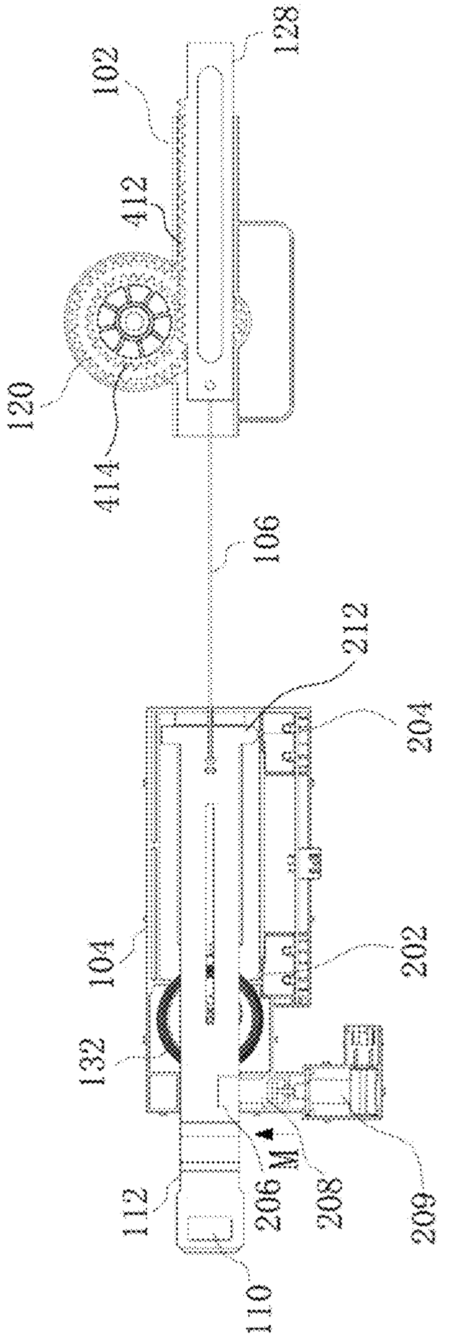
Figure 5F:
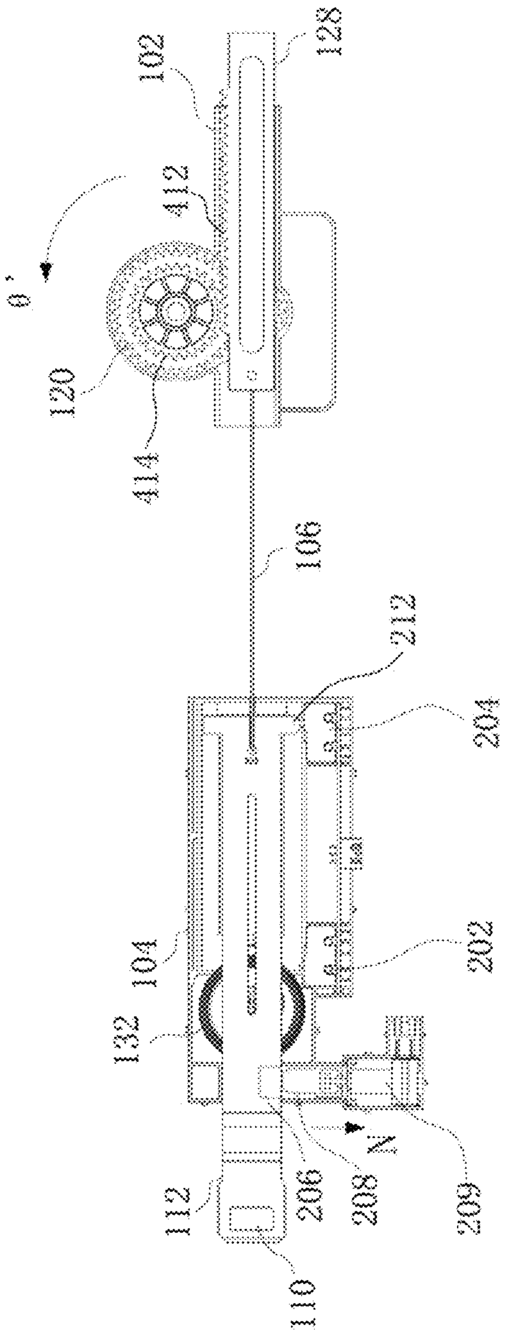
Figure 5G:
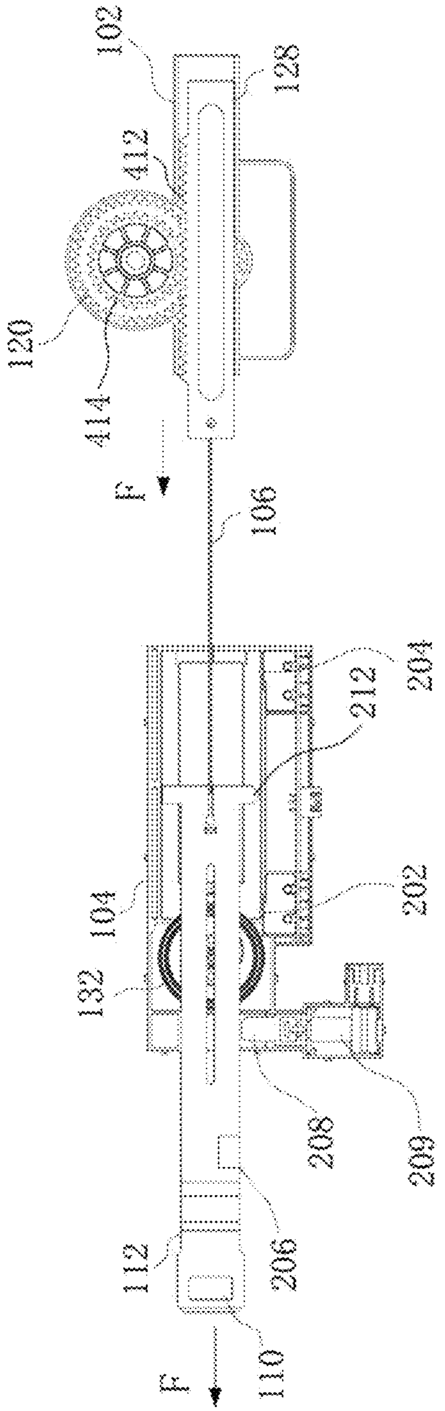

FIGS. 5A-5G are schematic diagrams showing movement of the door lock slider 112 in FIGS. 1A and 2A-2B between the extended position and the retracted position under the driving of the driving motor 128 in the driving device 102 and the coil spring 132 in the door lock box 104, so as to show a cooperation relationship and a positional relationship between various components in FIGS. 1A and 2A-2B. Specifically, (1) FIG. 5A is a schematic diagram of a door lock assembly 100 at an extended position; (2) FIGS. 5B-5E are schematic diagrams showing movement of the door lock assembly 100 from the extended position to the retracted position; and (3) FIGS. 5F-5G are schematic diagrams showing movement of the door lock assembly 100 from the retracted position to the extended position. The extended position of the door lock assembly 100 corresponds to a heat dissipation position of a door of an electrical equipment, and the retracted position of the door lock assembly 100 corresponds to a closing position of the door of the electrical equipment. For a more concise presentation, a cooperation relationship between the door hook 108 and the door lock slider 112 is hidden in FIGS. 5A-5G. However, for those of at least ordinary skill in the art, during control of the door lock assembly 100 shown in FIGS. 5A-5G, the door hook 108 is always kept engaged with the door hook hole 110 of the door lock slider 112.

As mentioned above, FIG. 5A is a schematic diagram of the door lock assembly 100 at the extended position. As shown in FIG. 5A, when the door is at the heat dissipation position (refer to FIG. 6C), the door lock slider 112 is at the extended position, that is, a leftmost position to which the door lock slider 112 moves. The switch actuating part 212 of the door lock slider 112 triggers the first microswitch 202 to send a signal that the door is at the heat dissipation position to a control device (not shown in the figure). The driving rack 128 is also at the leftmost position, and the first set of teeth 414 of the driving gear 120 is at a neutral position, such that the first set of teeth 414 does not engage with the teeth 412 of the driving rack 128. Since the locking pin 208 is not aligned with the pin slot 206 of the door lock slider 112, the locking pin cannot be inserted into the pin slot 206 and is at the exit position.

As mentioned above, FIGS. 5B-5E are schematic diagrams showing movement of the door lock assembly 100 from the extended position to the retracted position.

As shown in FIGS. 5B-5C, when an operator inputs a door closing instruction on a control panel of a dishwasher or a control program of the dishwasher runs to a door closing stage, a control device (not shown in the figure) can control the driving motor 126 to drive the driving gear 120 to rotate counterclockwise. Specifically, before the driving gear 120 rotates from the position shown in FIG. 5A to the position shown in FIG. 5B, the driving gear first rotates idly counterclockwise by an angle θ, such that the first set of teeth 414 of the driving gear 120 rotates beyond the neutral position, and thus the first set of teeth 414 of the driving gear 120 is ready to be in contact (or engagement) with the teeth 412 of the driving rack 128. Then the driving gear 120 moves from the position shown in FIG. 5B to the positions shown in FIGS. 5C and 5D. The first set of teeth 414 of the driving gear 120 engages with the teeth 412 of the driving rack 128, and thus the counterclockwise rotation of the driving gear 120 can drive the driving rack 128 to move in the first linear direction E. The movement of the driving rack 128 can pull the door lock slider 112 to move in the first linear direction E by means of the pulling string 106, and the movement of the door lock slider 112 can drive the coil spring 132 to twist through the engagement between the slider rack 304 and the slider gear 306 (see FIGS. 3A-3B), such that the coil spring 132 accumulates elastic potential energy during the twisting process.

As shown in FIGS. 5D-5E, when the door lock slider 112 moves to the retracted position of the door lock assembly shown in FIG. 5D, the switch actuating part 212 of the door lock slider 112 triggers the second microswitch 204 to send a door closing signal to a control device (not shown in the figure). In this case, the door lock slider 112 is at the retracted position, that is, a rightmost position to which the door lock slider 112 moves, and the driving rack 128 is also at the rightmost position. As shown in FIG. 5E, the pin slot 206 of the door lock slider 112 is aligned with the locking pin 208 when the door lock slider 112 is at the retracted position, such that the locking pin 208 can be inserted into the pin slot 206 in a third linear direction M under the action of a spring (not shown in the figure), thus completing the locking of the door lock slider 112. In this case, the first set of teeth 414 of the driving gear 120 is kept engaged with the teeth 412 of the driving rack 128.

It should be noted that heat dissipation operation time duration is predetermined (for example, 30 seconds). After the predetermined heat dissipation operation time duration is expired, a controller sends out a door closing control signal to pull the door lock slider 112 back to the closed position from the heat dissipation position (that is, an electric door is moved from the heat dissipation position to the closed position). Moreover, the locking pin 208 is inserted into the pin slot 206.

As mentioned above, FIGS. 5F-5G are schematic diagrams showing movement of the door lock assembly 100 from the retracted position to the extended position.

As shown in FIG. 5F, when the operator inputs a heat dissipation instruction on the control panel of the dishwasher or the control program of the dishwasher runs to a heat dissipation stage, the control device can control the driving motor 126 to drive the driving gear 120 to rotate counterclockwise by a rotation angle θ', such that the first set of teeth 414 of the driving gear 120 rotates to the neutral position and is disengaged from the teeth 412 of the driving rack 128, and thus the first set of teeth 414 of the driving gear 120 will not interfere with the movement of the driving rack 128 in subsequent operations.

After the first set of teeth 414 of the driving gear 120 rotates to the neutral position, the control device sends a pulse signal, for example, a pulse signal with duration of 20 milliseconds, to the locking pin coil 209. Under the action of the pulse signal, the locking pin coil 209 generates an electromagnetic force to pull the locking pin 208 in a fourth linear direction N, such that the locking pin 208 exits the pin slot 206 in the fourth linear direction N, thus removing the locking of the door lock slider 112. As shown in FIG. 5G, the door lock slider 112 will no longer resist a torsional force of the coil spring 132 after losing the lock of the locking pin 208. The coil spring 132 in a twisted state releases elastic potential energy by means of the torsional force, and the engagement between the slider gear 306 and the slider rack 304 drives the door lock slider 112 to move in the second linear direction F. When the pulse signal disappears, the pin slot 206 has moved in the second linear direction F with the door lock slider 112 by a distance, and the locking pin 208 cannot be aligned with the pin slot 206, so that the locking pin 208 is kept at the exit position. The movement of the door lock slider 112 pulls the door lock slider 112 to also move in the second linear direction F by means of the pulling string 106.

When the coil spring 132 completely releases the clastic potential energy, the door lock slider 112 moves to the extended position shown in FIG. 5A in the second linear direction F, that is, the leftmost position to which the door lock slider 112 moves, and the driving rack 128 is also at the leftmost position. The switch actuating part 212 of the door lock slider 112 triggers the first microswitch 202 to send a signal that the door is at the heat dissipation position to a control device (not shown in the figure). The door lock assembly 100 completes one movement cycle between the extended position and the retracted position.

The operation process shown in FIGS. 5A-5G above drives the dishwasher door to move between the heat dissipation position and the closed position through the movement of the door lock slider 112 between the extended position and the retracted position, and the door hook 108 and the door hook hole 110 are always kept engaged during the movement. The complete opening or closing of the door can be achieved directly by pulling the door bolt on the outer side of the door to disengage the door hook 108 from the door hook hole 110. It can be seen that during the operation shown in FIGS. 5A-5G, the driving gear 120 always rotates counterclockwise, so the torque output by the driving motor 126 can only be in a single rotation direction.

It should be noted that in this embodiment, the door hook 108 is also provided with a microswitch (not shown in the figure). When the microswitch on the door hook 108 detects that the door hook 108 is disengaged from the door hook hole 110, that is, the door has a tendency to be opened completely, the control device controls the door lock slider 112 to move to the retracted position (that is, the operation process in FIGS. 5B-5E). Especially when the door lock slider 112 is at the extended position, if a door opening operation is to be performed (the door hook 108 is disengaged from the door hook hole 110), the door lock slider 112 extends out by a distance in an open state of the door, which may cause a user to accidentally touch the door lock slider 112 during the operation and cause an unnecessary injury risk. Therefore, once the door hook 108 is disengaged from the door hook hole 110 (door opening process), the control device controls the door lock slider 112 to retract to the retracted position, which can avoid the above injury risk.

However, for those of at least ordinary skill in the art, it is also possible to control the complete opening or closing of the door directly or control the opening of the door within a certain openness range only by the extending or retraction of the slider by properly setting the reasonable position of the door lock assembly, without the cooperative connection between the door hook and the door hook hole.

FIGS. 6A-6C are schematic views of a dishwasher 600 with a door lock assembly 100 according to the present disclosure, which show application scenarios of the door lock assembly 100 and a cooperation relationship between the door lock assembly 100 and a door hook 108. In FIGS. 6A-6C, FIG. 6A shows an open door state of the dishwasher 600; FIG. 6B shows a closed door state of the dishwasher 600; and FIG. 6C shows a heat dissipation state of the dishwasher 600.

FIGS. 6A-6B are schematic diagrams of a dishwasher 600 with a door lock assembly 100 according to the present disclosure at an open position and a closed position.

As shown in FIGS. 6A-6B, the dishwasher 600 is provided with a dishwasher body 602, a cavity 604 for accommodating dishes, and a dishwasher door 606 for closing the cavity. The dishwasher door 606 can pivot about a pivot axis X, such that the dishwasher door 606 is opened or closed. A door hook 108 and a door bolt 612 are arranged on the dishwasher door 606. A door lock assembly 100 is mounted on the dishwasher body 602 at a position corresponding to the door hook 108, and the door hook 108 on the washing machine door 606 can cooperate with a door hook hole 110 of a door lock slider 112. By pulling the door bolt 612, the door hook 108 can exit the door hook hole 110 in a rotating manner, and once a pulling force on the door bolt 612 is removed, the door hook 108 is immediately restored to an initial position. When the door hook 108 collides with an edge of the door hook hole 110, the door hook 108 will be rotated into the door hook hole 110, thus keeping engagement with the door hook hole 110.

When the door hook 108 is engaged with the door hook hole 110 of the door lock slider 112, the door lock slider 112 may extend or retract in the manner shown in FIGS. 5A-5G, to control the dishwasher door 606 to move between the heat dissipation position and the closed position; or when the door hook 108 is disengaged from the door hook hole 110 of the door lock slider 112, the door lock slider 112 is kept at (moved to) the retracted position as shown in FIG. 2A under the control of a control device.

FIG. 6C is a schematic diagram of the dishwasher 600 shown in FIG. 6A at a heat dissipation position.

As shown in FIG. 6C, when the dishwasher 600 is at the heat dissipation position, the door hook 108 is kept engaged with the door lock slider 112, and the door lock slider 112 extends out by a distance D relative to the dishwasher 600 at the closed position, corresponding to a moving distance D of the door lock slider 112 shown in FIGS. 2A-2B, that is, the width of the door gap by which the dishwasher door 606 is opened at the heat dissipation position is D.

The dishwasher 600 shown in FIGS. 6A-6C is only an example, and the door lock assembly 100 according to the present disclosure can also be mounted on various types of electrical equipment each having a cavity and a door for closing the cavity, such as a washing machine, a clothes dryer, and a microwave oven, and can also be mounted on other non-electrical equipment.

The objective of the present disclosure is to at least partially resolve the foregoing technical problem.

Compared with the prior art, the door lock assembly 100 according to the present disclosure has the following beneficial technical effects.

First, in the door lock assembly according to the present disclosure, the rotation axis of the bias device passes through the center of the moving path of the slider, such that the bias force of the bias device applied on the slider is more uniform, and the bias force does not generate too much extra torque on the slider. Therefore, the position arrangement of the bias device in the present disclosure is more reasonable, the slider can be driven to move by generating a small bias force, such that the equipment door can be driven to and fro with a small force, and requirements on an elastic force provided by the bias device (such as the coil spring) are lower.

Second, through reasonable structural arrangement, the door lock box and the driving device can be respectively mounted in two housings of an electrical equipment.

Third, the door lock box of the door lock assembly is connected to the driving device by means of the flexible pulling string, such that the position arrangement of the door lock box and the driving device of the door lock assembly is more flexible, and the position arrangement of the door lock box and the driving device can make full use of a narrow space of the electrical equipment, that is, the position arrangement of the driving device is not limited by the position of the door lock box.

Fourth, in the dishwasher according to the present disclosure, after a heat dissipation operation is completed, the door lock assembly provides a structure in which the door can be automatically closed by a control component, so that the operator can open the door when necessary. Such an operation improves the operability of the dishwasher.

Fifth, the driving motor in the present disclosure is configured to achieve the reciprocating movement of the slider only by rotating in a single direction, so that requirements for the motor are low and the control over the motor is simple, thus making the control of the movement of the door between the heat dissipation position and the closed position simpler.

Therefore, the present disclosure provides a door lock, which makes the slider stressed more uniformly and reasonably, that is, the bias device does not generate too much extra torque on the slider, and the bias device can drive the slider to move by generating a small bias force.

Moreover, the present disclosure provides a door lock, which makes the arrangement of the driving device more flexible, that is, the position arrangement of the driving device is not limited by the position of the door lock box.

Although the present disclosure is described in conjunction with the examples of embodiments outlined above, various alternatives, modifications, variations, improvements, and/or substantial equivalents that are known or current or to be anticipated before long may be obvious to those of at least ordinary skill in the art. In addition, the technical effects and/or technical problems described in the present disclosure are illustrative rather than restrictive. Therefore, the disclosed description in the present disclosure may be used to solve other technical problems and have other technical effects and/or may solve other technical problems. Accordingly, the examples of the embodiments of the present disclosure as set forth above are intended to be illustrative rather than limiting. Various changes can be made without departing from the spirit or scope of the present disclosure. Therefore, the present disclosure is intended to include all known or earlier developed alternatives, modifications, variations, improvements and/or basic equivalents.

The invention claimed is:

1. A door lock assembly (100) comprising:

a door lock slider (112) configured to reciprocate in a first linear direction (E) or a second linear direction (F) along a length of the door lock slider (112), wherein the door lock slider (112) comprises a slider body (301) provided with a slider groove (308) disposed along a length of the slider body (301), and the slider groove (308) including a slider rack (304) at at least one side of the slider groove (308);

a slider gear (302) disposed within the slider groove (308) and configured to rotate about a rotating shaft (314), and the slider gear (302) engaging the slider rack (304), wherein the slider gear (302) and the slider rack (304) are configured that the door lock slider (112) reciprocates along the first linear direction (E) or the second linear direction (F) when the slider gear (302) rotates about the rotating shaft (314) in a first rotation direction or a second rotation direction;

a bias device (132) for driving the slider gear (302) such that the slider gear (302) drives the door lock slider (112) to move in the second linear direction (F);

a driving device (102) for pulling the door lock slider (112) along the first linear direction (E), wherein the driving device (102) is connected with the door lock slider (112) via a flexible component (106), and the driving device (102) pulls the door lock slider (112) along the first linear direction (E) through the flexible component (106); and at least one constant pulley (151,152,153) configured to change a moving path of the flexible component (106).

2. The door lock assembly of claim 1, the door lock assembly (100) being used for locking a door (606) of an electrical equipment, wherein the door (606) comprises an open position, a closed position and one or more intermediate positions;

the first linear direction (E) of the door lock slider (112) corresponds to the moving direction of the door (606) from the one or more intermediate positions to the closed position; and the second linear direction (F) of the door lock slider (112) corresponds to the moving direction of the door (606) from the closed position to the one or more intermediate positions, wherein the one or more intermediate positions are disposed between the open position and the closed position.

3. The door lock assembly of claim 2, further comprising:

a first microswitch (202) for indicating that the door (606) is at the one or more intermediate positions; and a second microswitch (204) for indicating that the door (606) is at the closed position;

wherein the door lock slider (112) is provided with a switch actuating part (212) on an other side of the door lock slider (112) opposite to a door hook hole (110), during a reciprocating process of the door lock slider (112), the first microswitch (202), the second microswitch (204) and the switch actuating part (212) are configured that:

(1) the switch actuating part (212) actuates the first microswitch (202) when the door (606) is at the one or more intermediate positions; or (2) the switch actuating part (212) actuates the second microswitch (204) when the door (606) is at the closed position.

4. The door lock assembly of claim 1, wherein the slider groove (308) is disposed along the length of the door lock slider (112).

5. The door lock assembly of claim 1, wherein the bias device (132), the slider gear (302) and the slider rack (304) are configured that:

(1) the rotation of the slider gear (302) in the first rotation direction causes the bias device (132) to accumulate bias force when the door lock slider (112) moves along the first linear direction (E); and (2) the bias force accumulated in the bias device (132) is able to actuate the slider gear (302) to rotate in the second rotation direction, so as to drive the door lock slider (112) to move along the second linear direction (F).

6. The door lock assembly of claim 1, wherein the rotating shaft (314) extends into the slider groove (308) of the door lock slider (112).

7. The door lock assembly of claim 1, wherein the bias device (132) is a rotating bias device; and the bias force is torsional force.

8. The door lock assembly of claim 7, wherein the bias device (132) is a coil spring (132), and the slider gear (302) is secured to the coil spring (132) coaxially to allow the rotation of the slider gear (302) to drive the coil spring (132) to twist so as to accumulate the torsional force.

9. The door lock assembly of claim 1, wherein the door lock slider (112) is provided with a door hook hole (110) for accommodating a door hook (108) on one end of the door lock slider (112).

10. The door lock assembly of claim 1, further comprising:

a locking pin (208) configured that:

(1) the door lock slider (112) is locked to be unmovable when the locking pin (208) inserts into the door lock slider (112); or (2) the door lock slider (112) is released to be able to reciprocate when the locking pin (208) disengages from the door lock slider (112).

11. The door lock assembly of claim 10, further comprising:

an actuator (209) driving the locking pin (208) to move.

12. The door lock assembly of claim 10, wherein the door lock slider (112) is provided with a pin slot (206);

wherein the locking pin (208) and the pin slot (206) are configured that:

(1) the door lock slider (112) is locked to be unmovable when the locking pin (208) inserts into the pin slot (206); or (2) the door lock slider (112) is released to be able to reciprocate when the locking pin (208) disengages from the pin slot (206).

13. The door lock assembly of claim 1, further comprising:

a door lock box (104), wherein the door lock slider (112), the slider gear (302) and the bias device (132) are disposed in the door lock box (104).

14. The door lock assembly of claim 13, wherein the door lock assembly (100) is used for a dishwasher (600).

15. An electrical equipment (600), comprising the door lock assembly (100) of claim 1 and a door (606), wherein the door (606) comprises one or more intermediate positions and a closed position;

wherein the door lock assembly (100) is configured to drive the door (606) to move between the one or more intermediate positions and the closed position.

16. A door lock assembly (100) comprising:

a door lock slider (112) configured to reciprocate in a first linear direction (E) or a second linear direction (F) along a length of the door lock slider (112), wherein the door lock slider (112) comprises a slider body (301) provided with a slider groove (308) disposed along a length of the slider body (301), and the slider groove (308) including a slider rack (304) at at least one side of the slider groove (308);

a slider gear (302) disposed within the slider groove (308) and configured to rotate about a rotating shaft (314), and the slider gear (302) engaging the slider rack (304), wherein the slider gear (302) and the slider rack (304) are configured that the door lock slider (112) reciprocates along the first linear direction (E) or the second linear direction (F) when the slider gear (302) rotates about the rotating shaft (314) in a first rotation direction or a second rotation direction;

a bias device (132) for driving the slider gear (302) such that the slider gear (302) drives the door lock slider (112) to move in the second linear direction (F); and a driving device (102) for pulling the door lock slider (112) along the first linear direction (E), wherein the driving device (102) is connected with the door lock slider (112) via a flexible component (106), the driving device (102) pulls the door lock slider (112) along the first linear direction (E) through the flexible component (106), and the driving device (102) comprises:

a driving gear (120) configured to rotate unidirectionally and provided with a gear teeth driving portion (414) and a toothless portion (432) on the periphery of the driving gear (120); and a driving rack (128) for driving the door lock slider (112) to move along the first linear direction (E) and being able to reciprocate along the first linear direction (E) and the second linear direction (F);

wherein the driving gear (120) and the driving rack (128) are configured that:

(1) the driving rack (128) engages the gear teeth driving portion (414) when the driving rack (128) drives the door lock slider (112) to move along the first linear direction (E), so as to drive the door lock slider (112) to move along the first linear direction (E); or (2) the movement route of the driving rack (128) corresponds to the toothless portion (432) when the driving rack (128) drives the door lock slider (112) to move along the second linear direction (F), so as to reduce the resistance generated when the door lock slider (112) moves along the second linear direction (F).

17. The door lock assembly of claim 16, wherein the flexible component (106) is connected with the door lock slider (112) linearly.

18. The door lock assembly of claim 16, further comprising:

at least one constant pulley (151,152,153) configured to change a moving path of the flexible component (106).

19. The door lock assembly of claim 16, wherein the driving gear (120) and the driving rack (128) are configured that:

the driving rack (128) engages the gear teeth driving portion (414) when the driving gear (120) rotates within a first angle range, or the movement route of the driving rack (128) corresponds to the toothless portion (432) of the driving gear (120) when the driving gear (120) rotates within a second angle range.

20. The door lock assembly of claim 19, wherein the driving gear (120) and the driving rack (128) are configured that:

the driving rack (128) moves along the first linear direction (E) when the driving gear (120) rotates within the first angle range, so as to drive the door lock slider (112) to move along the first linear direction (E); or the door lock slider (112) moves along the second linear direction (F) and drives the driving rack (128) to move along the second linear direction (F) when the movement route of the driving rack (128) corresponds to the toothless portion (432) of the driving gear (120).

21. The door lock assembly of claim 20, wherein the driving gear (120) and the driving rack (128) are configured that:

the driving gear (120) drives the driving rack (128) to move from a start position to an end position when the driving gear (120) rotates within the first angle range;

the door lock slider (112) drives the driving rack (128) to move from the end position to the start position when the driving gear (120) rotates to within the second angle range.

22. The door lock assembly of claim 21, wherein the driving device (102) further comprises:

a driving motor (126) for driving the driving gear (120) to rotate within the first angle range and the second angle range.

* * * * *